United States Patent
Lhost et al.

(10) Patent No.: US 12,286,497 B2
(45) Date of Patent: Apr. 29, 2025

(54) PROCESS FOR THE PRODUCTION OF GRAFTED POLYETHYLENE AND GRAFTED POLYETHYLENE

(71) Applicants: TOTALENERGIES ONETECH, Courbevoie (FR); UNIVERSITÉ CLAUDE BERNARD LYON 1 (UCBL), Villeurbanne (FR); CENTRE NATIONAL DE LA RECHERCHE SCIENTIFIQUE (CNRS), Paris (FR); UNIVERSITÉ JEAN MONNET SAINT-ETIENNE, Saint-Etienne (FR); INSTITUT NATIONAL DES SCIENCES APPLIQUÉES DE LYON (INSA LYON), Villeurbanne (FR)

(72) Inventors: Olivier Lhost, Seneffe (BE); Pascal Navez, Seneffe (BE); Yves Trolez, Seneffe (BE); Philippe Cassagnau, Villeurbanne (FR); Mohammad Abou-Taha, Saint Genis Pouilly (FR); Karim Delage, Villeurbanne (FR); Emmanuel Beyou, Villeurbanne (FR)

(73) Assignees: TOTALENERGIES ONETECH, Courbevoie (FR); UNIVERSITÉ CLAUDE BERNARD LYON 1 (UCBL), Villeurbanne (FR); CENTRE NATIONAL DE LA RECHERCHE SCIENTIFIQUE (CNRS), Paris (FR); UNIVERSITÉ JEAN MONNET SAINT-ETIENNE, Saint-Etienne (FR); INSTITUT NATIONAL DES SCIENCES APPLIQUÉES DE LYON (INSA LYON), Villeurbanne (FR)

( * ) Notice: Subject to any disclaimer, the term of this patent is extended or adjusted under 35 U.S.C. 154(b) by 0 days.

(21) Appl. No.: 18/845,809
(22) PCT Filed: Mar. 2, 2023
(86) PCT No.: PCT/EP2023/055340
§ 371 (c)(1),
(2) Date: Sep. 10, 2024
(87) PCT Pub. No.: WO2023/174714
PCT Pub. Date: Sep. 21, 2023

(65) Prior Publication Data
US 2025/0109232 A1  Apr. 3, 2025

(30) Foreign Application Priority Data
Mar. 18, 2022 (EP) .................................... 22315070

(51) Int. Cl.
*C08F 255/02* (2006.01)
*B32B 1/08* (2006.01)
(Continued)

(52) U.S. Cl.
CPC .............. *C08F 255/02* (2013.01); *B32B 1/08* (2013.01); *B32B 15/085* (2013.01); *B32B 15/18* (2013.01);
(Continued)

(58) Field of Classification Search
USPC .................................................... 525/53, 285
See application file for complete search history.

(56) References Cited

U.S. PATENT DOCUMENTS

| | | | | |
|---|---|---|---|---|
| 4,762,890 A | * | 8/1988 | Strait ..................... | C08F 255/02 525/257 |
| 5,194,509 A | * | 3/1993 | Hasenbein ............ | C08F 255/02 525/285 |

FOREIGN PATENT DOCUMENTS

| | | |
|---|---|---|
| WO | 2015102886 A2 | 7/2015 |
| WO | 2016025317 A1 | 2/2016 |
| WO | 2019214975 A1 | 11/2019 |

OTHER PUBLICATIONS

Chung Chan I, "Extrusion of Polymers Theory & Practice 2nd Edition Sample Chapter 2: Physical Description of Single-Screw Extrusion", (Dec. 31, 2001), pp. 13-57.
(Continued)

*Primary Examiner* — Fred M Teskin
(74) *Attorney, Agent, or Firm* — Ewing & Jones, PLLC

(57) ABSTRACT

Process of grafting of a polyethylene-containing material to produce a modified polyethylene composition comprising
(Continued)

providing a twin screw extruder with one or more thermal regulation devices; a polyethylene-containing material and a grafting agent and extruding the polyethylene-containing material and the grafting agent to obtain a modified polyethylene composition; the step of extruding comprises a thermal treatment of the polyethylene-containing material by self-heating of the material at a maximum barrel temperature Ts ranging from 315° C. to 410° C. in one or more hot zones of the extruder.

20 Claims, 6 Drawing Sheets

(51) Int. Cl.
*B32B 15/085* (2006.01)
*B32B 15/18* (2006.01)
*B32B 15/20* (2006.01)
*B32B 27/08* (2006.01)
*B32B 27/30* (2006.01)
*B32B 27/32* (2006.01)

(52) U.S. Cl.
CPC .............. *B32B 15/20* (2013.01); *B32B 27/08* (2013.01); *B32B 27/306* (2013.01); *B32B 27/32* (2013.01); *B32B 2439/70* (2013.01); *B32B 2597/00* (2013.01)

(56) References Cited

OTHER PUBLICATIONS

Zhang Yuncan et al., "HDPE functionalization via high shear stress-induced initiation and its effects on HDPE/GF composite", Polymer Engineering And Science, US, (Nov. 1, 2008), vol. 48, No. 11, pp. 2277-2286.

International Preliminary Report on Patentability issued in Application No. PCT/EP2023/055340, dated Feb. 14, 2024, 17 pages.

* cited by examiner

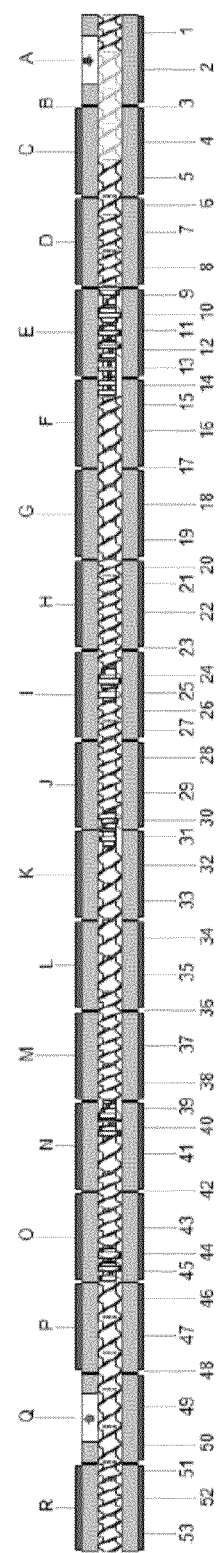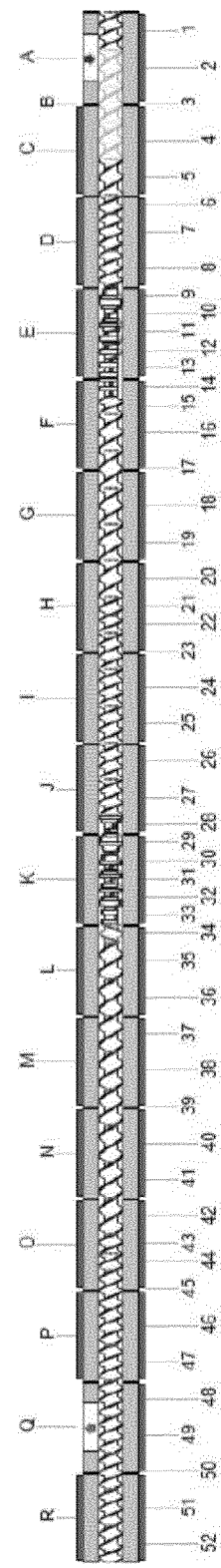
Figure 1                    Figure 2

PROCESS FOR THE PRODUCTION OF GRAFTED POLYETHYLENE AND GRAFTED POLYETHYLENE

CROSS-REFERENCE TO RELATED APPLICATIONS

This application claims the benefit of PCT/EP2023/055340 filed Mar. 2, 2023, which claims priority from EP 22315070.7 filed Mar. 18, 2022, which are incorporated herein by reference in their entireties for all purposes.

TECHNICAL FIELD

The present disclosure relates to modified polyethylene compositions, with preference comprising recycled polyethylene, as well as processes to produce such modified polyethylene compositions. In particular, the present disclosure relates to modified polyethylene compositions that can be used as a compatibilizing agent and are suitable for composite material production.

TECHNICAL BACKGROUND

Polyolefins represent 40% of the global production of plastic materials. There is hence a clear necessity to develop new sustainable means of recycling for these materials. Nowadays, the mechanical recycling of polyolefins is one of the most viable solutions towards sustainable development because it relies on well-known technologies already in use like the compatibilization of mixtures of polymers and their formulations. The thermal degradation of plastic waste has been already developed via pyrolysis to transform the material into liquid fuel or waxes.

PE-g-MA i.e., polyethylene modified with maleic anhydride (MA) as a polar co-monomer is a commercially available product that exhibits enhanced adhesion between polar and apolar products. It is thus used as a compatibilizing agent, improving mechanical properties, for example in wood-plastic composites, glass fiber-polyethylene composites, elastomers blends, polyamide-polyolefins compatibilizations. The presence of grafted MA on polyethylene (PE) enhances the processability as well as the miscibility of some polymer mixtures thanks to its polar nature. Moreover, the PE-g-MA can be used as a chemical precursor thanks to its carboxylic functions, allowing by which the synthesis of new copolymers; or even to be used as raw material for the elaboration of new foams.

Several types of initiation are known but the most commonly used is peroxide initiation. The main drawback of grafting by a radical pathway is the low selectivity of the alkoxyl radicals generated from the dissociation of peroxides, leading to side reactions such as coupling, chain scission and homopolymer formation. When considering the production of PE-g-MA, coupling (cross-linking) of the polyethylene chains is the most important side reaction occurring during this process, inducing a decrease of the melt index. In addition, peroxide decomposition generates volatiles organic compounds (VOC) and undesirable odours. There is a need to find a solution to this problem.

Many efforts were performed in order to avoid or at least to reduce the melt index decrease during the grafting process. As described by M. D. Rakotonirina et al. (Polym. Chem. 10, 4336 (2019)), the use of acyloxyimides as a H-abstracting agent at 230° C. allows obtaining only a slight modification of the polyethylene chain structure (and thus of the viscosity) as proved by rheological experiments. Several other options to do so are mentioned in the introduction of the above-cited publication. Bhattacharya et al. (J. Appl. Polym. Sci. 78, 2405 (2000)) showed that the use of styrene as a comonomer during the grafting reaction of maleic anhydride onto PE leads to a higher degree of grafting and less crosslinking. Chaudhary et al. (Polym. Eng. Sci., 47, 50-61 (2007)) showed that the scavenging of carbon-centered radicals by nitroxides and their derivatives is able to control the crosslinking of polyethylene chains initiated with peroxides. Nevertheless, there is a need to find a solution to decorrelate the grafting level from the viscosity change.

Indeed, in no case, a significant melt index increase (or in other words a decrease of the viscosity) is reported, allowing to extend the range of starting polyethylene to viscous one (including recycled viscous polyethylene grades). In no case, a safe and economic process able to produce a PE-g-MA grade with a very high melt index is mentioned. As this is due to the cross-linking reactions of polyethylene, using presented processes, the same limitation would be encountered if grafting of other molecules than maleic anhydride would be considered.

As a direct consequence of this important contribution of cross-linking reactions, there is no significant flexibility in terms of the polyethylene used as starting material of the grafting reactions. Classically, the melt index of the starting polyethylene grade is higher than the targeted value of the PE-g-MA grade. Such constraint strongly limits the use, for example, of recycled polyethylene fluxes. More precisely, the use of viscous recycled polyethylene fluxes is strongly restricted, limiting the valorization options of such grades.

There is a need to find a solution that allows the valorisation of recycled polyethylene for use as compatibilizing agent. The disclosure aims to decorrelate the grafting level of polyolefins such as polyethylene from the viscosity change. The disclosure further aims to broaden the range of polyethylene-containing materials that can be used as starting material for the production modified polyethylene composition suitable to be used as compatibilizing agents in the production of composite material and/or as raw material in the production of copolymers or foams.

Zhang Y. et al. in Polymer Engineering and Science 2008, pages 2277 to 2285 "HDPE functionalization via high shear stress-induced initiation and its effects on HDPE/GF composite" reads that functionalised products can be obtained by increasing the rotation speed during melt extruding process. A tendency of increase of grafting was observed with the increase of the screw rotation. FIG. 1 of this document show that the increasing tendency of the percentage of grafting reaches to a maximum at a reaction temperature of 270° C. When the reaction temperature is increased to 310° C. the increasing tendency of the percentage of grafting decreases.

This document is interesting but the grafting percentage obtained is still insufficient. Indeed, grafting percentage of about 0.6 wt. % are attained at 270° C. while higher grafting percentage are required in many applications. There is therefore a need for further improvement.

WO2016/025317 discloses a linear low-density polyethylene grafted with maleic anhydride (MAH-g-LLDPE) that is produced in an extruder at 425° C. and that has a melt index of 250 to 800 g/10 min. The grafting percentage can be of 1 wt. % but the product is not suitable for compatibilization but for adhesive composition. There is still a need for further improvement.

The disclosure further aims to provide a process for the production modified polyethylene composition suitable to be used as compatibilizing agents in the production of composite material and/or as raw material in the production of copolymers or foams; that broaden the range of polyethylene-containing materials that can be used as starting material and wherein high grafting percentage are obtained, for example of at least 0.8 wt. % or at least 1.0 wt. %.

SUMMARY

It has now been found that one or more of the above-mentioned needs can be fulfilled by performing a single extrusion of existing polyethylene-containing material, such as recycled polyethylene-containing material with a grafting agent at a high temperature Ts of at least 315° C., such as ranging from 315° C. to 410° C.

According to a first aspect, the disclosure provides for of grafting of a polyethylene-containing material to produce a modified polyethylene composition remarkable in that it comprises:
  a) providing a twin screw extruder with one or more thermal regulation devices;
  b) providing a polyethylene-containing material comprising at least 50 wt. % of polyethylene based on the total weight of the polyethylene-containing material;
  c) providing a grafting agent in a content ranging from 0.8 to 10.0 wt. % based on the total weight of the polyethylene-containing material provided on step (b), wherein the grafting agent comprises at least one double bond per molecule;
  d) extruding the polyethylene-containing material and the grafting agent to obtain a modified polyethylene composition; wherein step (d) of extruding comprises a thermal treatment of the polyethylene-containing material at a maximum barrel temperature Ts of ranging from 315° C. to 410° C. in one or more hot zones of the extruder, wherein the thermal treatment is performed by self-heating of the material; and
  e) recovering a modified polyethylene composition.

Surprisingly, it was found that it is possible to decorrelate the grafting level of polyethylene from the viscosity change resulting in the production of modified polyethylene compositions with a melt index (MI2) that is higher than the melt index of the starting polyethylene-containing material. This finding allows using viscous polyethylene (such as viscous recycled polyethylene fluxes) for production of modified polyethylene compositions with high melt index, i.e., suitable for use as compatibilizing agent. The process is remarkable by its simplicity since it can be performed in a twin-screw extruder. The process is also remarkable by its simplicity since the grafting is performed by extrusion at high barrel temperature Ts by self-heating of the material, and does not require the use of other agents for initiation, in particular, peroxide initiation is not required, or any sophisticated apparatus for Free Radical initiation (such as ultrasound, UV, etc.)

As demonstrated in the example, when extrusion is performed at the temperature of 315° C. or more an increasing tendency of grafting is observed which surprising since it goes against the prior art finding that optimum reaction temperature was 270° C.

The process is also remarkable because there is no chemical way to perform the scission of the polyethylene chain and the grafting. At the usual barrel temperature of processing and with standard extrusion conditions, there is a branching of the polyethylene chain (decrease of $MI_2$) since the use of organic peroxide leads to polyethylene branching and crosslinking. The increase of the melt index by a factor of at least 2 (such as at least 10 or at least 20) together with a high grafting level obtained by the specific extrusion conditions allows replying to long-felt need in the recycling field by enlarging the possible applications for the recycled feedstock.

For example, the process is performed without peroxides and/or without ultrasounds.

The Extruder and the Extrusion Step

The maximum barrel temperature Ts in the one or more hot zones of the extruder can be obtained by any ways. For example, the maximum barrel temperature Ts ranging from 315° C. to 410° C. in step (d) is obtained by self-heating of the material wherein the one or more hot zones have a total length equal to or greater than 6 D with D being the screw diameter, wherein the extrusion is performed with mechanical specific energy greater than or equal to 0.30 kWh/kg, wherein the screw profile comprises at least one hot zone with successive kneading blocks elements over a length of at least 4 D followed by a left-handed element with D being the screw diameter, wherein the thermal regulation devices, are set to initial imposed barrel temperatures ranging between 24° and 320° C., and are switched off when the barrel temperature in the zone spontaneously exceeds the imposed barrel temperature by at least 3° C. without the need of external heat application.

In an embodiment, the screw profile comprises two or more hot zones wherein a first hot zone comprises successive kneading blocks elements over a length of at least 4 D followed by a left-handed element with D being the screw diameter, and one or more additional hot zones placed downstream the first hot zone are filled mixing zones, each comprising kneading blocks elements over a length of at least 4 D followed by a kneading left-handed element or by a left-handed element with D being the screw diameter.

In an embodiment, the successive kneading blocks elements of at least one hot zone of the extruder comprise disks with disks offset by 90 degrees and a disk width of at least 0.3 D wherein D is the screw diameter.

In an embodiment, one hot zone of the extruder is or comprises the melting zone of the extruder.

In a preferred embodiment, the ratio of the melt index of the modified polyethylene composition ($MI_2$ T) to the melt index of the polyethylene-containing material ($MI_2$ R) is at least 2.0. This can be obtained by proper selection of the temperature of the thermal treatment and of the residence time.

In a preferred embodiment, the mechanical specific energy used during extrusion is selected to have the ratio of the melt index of the modified polyethylene composition ($MI_2$ T) to the melt index of the polyethylene-containing material ($MI_2$ R) to be at least 2.0.

For example, the ratio of the melt index of the modified polyethylene composition ($MI_2$ T) to the melt index of the polyethylene-containing material ($MI_2$ R) is at least 2.0; preferably, at least 3.0; preferably, at least 6.0; preferably, at least 10.0; preferably, at least 20.0.

In a preferred embodiment, the extrusion is performed with mechanical specific energy greater than or equal to 0.30 kWh/kg, preferably greater than or equal to 0.35 kWh/kg; more preferably greater than or equal to 0.40 kWh/kg, even more preferably greater than or equal to 0.45 kWh/kg; most preferably greater than or equal to 0.50 kWh/kg and even most preferably greater than or equal to 0.60 kWh/kg.

For example, step (d) of extruding the polyethylene-containing material comprises a thermal treatment self-heating of the material wherein the extrusion is performed at a maximum barrel temperature Ts ranging from 315 to 405° C. in at least one hot zone; preferably at a maximum barrel temperature ranging from 330 to 405° C.; more preferably at a maximum barrel temperature ranging from 340 to 400° C.; even more preferably at a maximum barrel temperature ranging from 360 to 400° C. and most preferably at a maximum barrel temperature ranging from 340 to 395° C., or ranging from 350° C. to 395° C.

For example, step (d) of extruding the polyethylene-containing material comprises a thermal treatment at a maximum barrel temperature of at least 315° C. in at least one hot zone; preferably at a temperature of at least 320° C.; more preferably at a temperature of at least 330° C.; even more preferably at a temperature of at least 340° C. and most preferably at a temperature of at least 350° C., or at a temperature of at least 360° C.

For example, step (d) of extruding the polyethylene-containing material comprises a thermal treatment at a maximum barrel temperature of at most 410° C. in at least one hot zone; preferably at a temperature of at most 405° C.; more preferably at a temperature of at most 400° C.; even more preferably at a temperature of at most 395° C. and most preferably at a temperature of at least 390° C.

For example, step (d) of extruding the polyethylene-containing material comprises performing the extrusion at a screw speed ranging from 100 to 1200 rpm.

For example, step (d) of extruding the polyethylene-containing material comprises performing the extrusion with a residence time of less than 10 minutes such as ranging from 10 seconds to 10 minutes; preferably with a residence time ranging from 20 seconds to 5 minutes; more preferably with a residence time ranging from 10 to 180 seconds; even more preferably, from 10 to 120 seconds; most preferably, from 20 to 100 seconds; and even most preferably, from 30 to 80 seconds.

The Polyethylene-Containing Material

In an embodiment, the polyethylene-containing material is selected to have:
 a high load melt index (HLMI R) of at least 1.0 g/10 min as determined according to ISO 1133-2011 at 190° C. under a load of 21.6 kg; and/or
 a melt index ($MI_2$ R) of at most 3.0 g/10 min as determined according to ISO 1133-2011 at 190° C. under a load of 2.16 kg; and/or
 a density of at least 0.910 g/cm$^3$ as determined according to ISO 1183-1:2012 at 23° C.

For example, the polyethylene-containing material is selected to have a melt index ranging from a high load melt index (HLMI R) as determined according to ISO 1133-2011 at 190° C. under a load of 21.6 kg of at least 1.0 g/10 min to a melt index ($MI_2$ R) of at most 3.0 g/10 min as determined according to ISO 1133-2011 at 190° C. under a load of 2.16 kg.

For example, the polyethylene-containing material is selected to have a density of at least 0.910 g/cm$^3$ as determined according to ISO 1183-1:2012 at 23° C.; preferably, at least 0.915 g/cm$^3$; more preferably, at least 0.920 g/cm$^3$; even more preferably, at least 0.930 g/cm$^3$; most preferably, at least 0.940 g/cm$^3$; and even most preferably, at least 0.945 g/cm$^3$; or at least 0.950 g/cm$^3$.

In a preferred embodiment, the polyethylene-containing material is selected to have a high load melt index (HLMI R) of at least 1.0 g/10 min as determined according to ISO 1133-2011 at 190° C. under a load of 21.6 kg, a melt index ($MI_2$ R) of at most 0.45 g/10 min as determined according to ISO 1133-2011 at 190° C. under a load of 2.16 kg and a density of at least 0.940 g/cm$^3$ as determined according to ISO 1183-1:2012 at 23° C.

In another embodiment, the polyethylene-containing material is selected to have a melt index ($MI_2$ R) ranging from 0.8 to 1.5 g/10 min as determined according to ISO 1133-2011 at 190° C. under a load of 2.16 kg and a density of ranging from 0.910 g/cm$^3$ to less than 0.940 g/cm$^3$ as determined according to ISO 1183-1:2012 at 23° C., preferably from 0.910 g/cm$^3$ to 0.935 g/cm$^3$ or from 0.910 g/cm$^3$ to 0.930 g/cm$^3$.

Whatever is the embodiment, the polyethylene-containing material further has:
 an Mz/Mw of at least 4.0 as determined by size exclusion chromatography (SEC); and/or
 a complex viscosity at 0.1 rad/sec at 190° C. of ranging from 20,000 to 80,000 Pa·s; and/or
 an Mw/Mn ranging from 5.0 to 30.0 as determined by size exclusion chromatography;
 and/or
 a complex viscosity ratio above 10 wherein the complex viscosity ratio is the ratio of the complex viscosity at a frequency of 0.1 rad/sec to the complex viscosity at a frequency of 100 rad/sec when measured at 190° C.

In one embodiment, the polyethylene-containing material further has a tan delta (G"/G' measured at 0.1 rad/s at 190° C.) of at most 3.0, preferably, of at most 2.6.

In one embodiment, the polyethylene-containing material further has a tan delta (G"/G' measured at 0.1 rad/s at 190° C.) of at least 0.5, preferably, of at least 0.8.

In one embodiment, the polyethylene-containing material further has a tan delta (G"/G' measured at 0.1 rad/s at 190° C.) ranging from 0.5 to 3.0; preferably, from 0.8 to 2.6.

For example, the polyethylene-containing material comprises at least 80 wt. % of polyethylene based on the total weight of the polyethylene-containing material; and/or is a recycled polyethylene-containing material.

For example, the polyethylene-containing material comprises at least one polymer different from polyethylene in a content ranging from 0 to 50 wt. % of the based on the total weight of the polyethylene-containing material wherein at least one polymer different from polyethylene is selected from polypropylene (PP), polyacrylate (PA), polyethylene terephthalate (PET), polystyrene (PS), polylactic acid (PLA), and any mixture thereof.

The Grafting Agent

In an embodiment, the grafting agent comprises or consists in one or more functional monomers selected from maleic anhydride (MAH), glycidyl methacrylate (GMA), methyl methacrylate (MMA), acrylic acid (AAc), butyl acrylate (BA) vinyl acetate (VA), diethyl maleate (DEM), acrylamide (AAm), acrylonitrile (CAN), and any mixture thereof. With preference, the grafting agent is or comprises maleic anhydride (MAH).

For example, the grafting agent is provided in a content ranging from 0.1 to 10.0 wt. % or from 0.8 to 8.0 wt. % or from 1.0 to 6.0 wt. % or from 1.5 to 4.0 wt. % or from 2.0 to 5.0 wt. % based on the total weight of the polyethylene-containing material provided on step (b).

The Modified Polyethylene Composition

In an embodiment, the modified polyethylene composition recovered in step (e) has one or more selected from:
 a melt index $MI_2$ ranging from 1.0 to 200.0 g/10 min as determined according to ISO 1133-2011 at 190° C. under a load of 2.16 kg; and/or
 a ratio of complex viscosity at a frequency of 0.1 rad/sec to the complex viscosity at a frequency of 100 rad/sec of at most 10.0 said ratio being measured at 190° C.; and/or
 a complex viscosity at 0.1 rad/sec at 190° C. of at most 20,000 Pa·s; and/or a grafting agent content of at least 0.7 wt. % based on total weight of the modified polyethylene composition.

In a preferred embodiment, the modified polyethylene composition recovered in step (e) has:
- a melt index $MI_2$ ranging from 1.0 to 200.0 g/10 min as determined according to ISO 1133-2011 at 190° C. under a load of 2.16 kg;
- a ratio of complex viscosity at a frequency of 0.1 rad/sec to the complex viscosity at a frequency of 100 rad/sec of at most 10.0 said ratio being measured at 190° C.;
- a complex viscosity at 0.1 rad/sec at 190° C. of at most 20,000 Pas; and
- a grafting agent content of at least 0.7 wt. % based on total weight of the modified polyethylene composition.

With preference, the grating agent is present in the modified polyethylene composition at a content ranging from 0.8 to 5.0 wt. % based on the total weight of the modified polyethylene composition; preferably from 0.9 to 4.0 wt. %; more preferably from 1.0 to 3.5 wt. %; even more preferably from 1.0 to 3.2 wt. % or from 1.0 to 3.0 wt. %, most preferably, from 1.1 to 2.8 wt. % or from 1.1 to 2.5 wt. %; and even most preferably from 1.2 to 2.2 wt. %.

With preference, the grating agent is present in the modified polyethylene composition at a content of at least 1.1 wt. % based on the total weight of the modified polyethylene composition; preferably, at least 1.2 wt. %; more preferably, at least 1.3 wt. %; even more preferably, at least 1.4 wt. % and most preferably, at least 1.5 wt. %.

It is understood that the grafting agent content represent the grafted content as determined by titration and does not include the unreacted grafting agent. In other words, the grafting agent content determination is performed after purification as described in the methods.

Should the desired grafting level be not obtained first time, the person skilled in the art may increase the maximum barrel temperature Ts in the one or more hot zones, the residence time or the screw speed.

For example, the modified polyethylene composition recovered in step (e) has a density of at least 0.910 g/cm³ as determined according to ISO 1183-1:2012 at 23° C.; preferably, at least 0.915 g/cm³; more preferably, at least 0.920 g/cm³; even more preferably, at least 0.930 g/cm³; most preferably, at least 0.940 g/cm³; and even most preferably, at least 0.945 g/cm³; or at least 0.950 g/cm³.

For example, the modified polyethylene composition recovered in step (e) has a melt index $MI_2$ ranging from 1.0 to 200.0 g/10 min or from 1.0 to 180.0 g/10 min as determined according to ISO 1133-2011 at 190° C. under a load of 2.16 kg; preferably ranging from 2.0 to 180.0 g/10 min; even more preferably from 4.0 to 150.0 g/10 min, most preferably from 10.0 to 100.0 g/10 min; and even most preferably or from 1.0 to 70.0 g/10 min or from 1.0 to 50.0 g/10 min or from 1.0 to 30.0 g/10 min.

For example, the modified polyethylene composition recovered in step (e) has a melt index $MI_2$ ranging from 1.0 to 20.0 g/10 min as determined according to ISO 1133-2011 at 190° C. under a load of 2.16 kg; preferably ranging from 1.2 to 10.0 g/10 min; even more preferably from 1.5 to 8.0 g/10 min and most preferably from 2.0 to 5.0 g/10 min.

For example, the modified polyethylene composition recovered in step (e) has a complex viscosity at 0.1 rad/sec at 190° C. of at most 20,000 Pas; preferably of at most 18,000 Pa·s. For example, the modified polyethylene composition recovered in step (e) further has a complex viscosity ratio of at most 8.0 wherein the complex viscosity ratio is the ratio of the complex viscosity at a frequency of 0.1 rad/sec to the complex viscosity at a frequency of 100 rad/sec when measured at 190° C.

With preference, modified the polyethylene composition recovered in step (e) further has an Mz/Mw of at most 7.0 as determined by size exclusion chromatography; preferably at most 6.0; preferably at most 5.0.

For example, the modified polyethylene composition recovered in step (e) further has an Mw/Mn ranging from 2.5 to 10.0 as determined by size exclusion chromatography.

For example, the modified polyethylene composition recovered in step (e) further has a tan delta (G"/G') at 0.1 rad at 190° C. above 2.5; preferably of at least 3.0; more preferably of at least 5.0 and even more preferably of at least 10.0.

According to a second aspect, the disclosure relates to a modified polyethylene composition remarkable in that it is obtained from the process according to the first aspect.

According to a third aspect, the disclosure relates to a modified polyethylene composition comprising at least 50 wt. % of polyethylene based on the total weight of the modified polyethylene composition, remarkable in that the modified polyethylene composition has:
- a melt index $MI_2$ ranging from 1.0 to 200.0 g/10 min as determined according to ISO 1133-2011 at 190° C. under a load of 2.16 kg;
- a ratio of complex viscosity at a frequency of 0.1 rad/sec to the complex viscosity at a frequency of 100 rad/sec of at most 10 said ratio being measured at 190° C.;
- a complex viscosity at 0.1 rad/sec at 190° C. of at most 20,000 Pa·s; and
- a grafting agent content of at least 0.7 wt. % based on total weight of the modified polyethylene composition.

For example, the modified polyethylene composition has a melt index $MI_2$ ranging from 2.0 to 200.0 g/10 min or from 1.0 to 180.0 g/10 min as determined according to ISO 1133-2011 at 190° C. under a load of 2.16 kg; preferably ranging from 4.0 to 180.0 g/10 min; even more preferably from 10.0 to 100.0 g/10 min and even most preferably or from 1.0 to 70.0 g/10 min or from 1.0 to 50.0 g/10 min or from 1.0 to 30.0 g/10 min.

For example, the modified polyethylene composition recovered in step (e) has a melt index $MI_2$ ranging from 1.0 to 20.0 g/10 min as determined according to ISO 1133-2011 at 190° C. under a load of 2.16 kg; preferably ranging from 1.2 to 10.0 g/10 min; even more preferably from 1.5 to 8.0 g/10 min and most preferably from 2.0 to 5.0 g/10 min.

For example, the modified polyethylene composition has a complex viscosity at 0.1 rad/sec at 190° C. of at most 18,000 Pa·s; preferably of at most 15,000 Pa·s.

For example, the modified polyethylene composition further has a ratio of complex viscosity at a frequency of 0.1 rad/sec to the complex viscosity at a frequency of 100 rad/sec of at most 8.0 said ratio being measured at 190° C.

With preference, modified the polyethylene composition further has an Mz/Mw of at most 7.0 as determined by size exclusion chromatography; preferably at most 6.0; preferably at most 5.0.

For example, the modified polyethylene composition further has an Mw/Mn ranging from 2.5 to 10.0 as determined by size exclusion chromatography.

For example, the modified polyethylene composition further has a tan delta (G"/G') at 0.1 rad at 190° C. above 2.5; preferably of at least 3.0; more preferably of at least 5.0 and even more preferably of at least 10.0.

With preference, the grating agent is present in the modified polyethylene composition at a content ranging from 0.8 to 5.0 wt. % based on the total weight of the modified polyethylene composition; preferably from 0.9 to 4.0 wt. %; more preferably from 1.0 to 3.5 wt. %; even more preferably from 1.0 to 3.2 wt. % or from 1.0 to 3.0 wt. %, most preferably, from 1.1 to 2.8 wt. % or from 1.1 to 2.5 wt. %; and even most preferably from 1.2 to 2.2 wt. %.

With preference, the grafting agent is present in the modified polyethylene composition at a content of at least 1.1 wt. % based on the total weight of the modified polyethylene composition; preferably, at least 1.2 wt. %; more preferably, at least 1.3 wt. %; even more preferably, at least 1.4 wt. % and most preferably, at least 1.5 wt. %.

According to a fourth aspect, the disclosure relates to the use of a polyethylene-containing material being a recycled polyethylene-containing material to produce a composite material; remarkable in that it comprises providing a recycled polyethylene-containing material comprising at least 50 wt. % of polyethylene based on the total weight of the recycled polyethylene-containing material; providing a grafting agent in a content ranging from 0.8 to 10.0 wt. % based on the total weight of the polyethylene-containing material, wherein the grafting agent comprises at least one double bound per molecule; extruding the recycled polyethylene-containing material and the grafting to obtain a modified polyethylene composition in an extruder with one or more thermal regulation devices; and then producing composite material from the modified polyethylene composition; wherein the extrusion comprises a thermal treatment of the recycled polyethylene-containing material at a maximum barrel temperature Ts ranging from 315° C. to 410° C. in one or more hot zones of the extruder.

With preference, the thermal treatment of the recycled polyethylene-containing material at a maximum barrel temperature Ts ranging from 315° C. to 410° C. in one or more hot zones of the extruder is performed by self-heating of the material wherein the extruder is a twin screw extruder and the one or more hot zones have a total length equal to or greater than 6 D with D being the screw diameter, wherein the extrusion is performed with mechanical specific energy greater than or equal to 0.30 kWh/kg, wherein, the screw profile comprises at least one hot zone with successive kneading blocks elements over a length of at least 4 D, with D being the screw diameter, followed by a left-handed element, wherein the thermal regulation devices, are set to initial imposed barrel temperatures ranging between 24° and 320° C., and are switched off when the barrel temperature in the zone spontaneously exceeds the imposed barrel temperature by at least 3° C. without the need of external heat application.

According to a fifth aspect, the disclosure relates to a composite material remarkable in that it comprises the polyethylene composition according to the second or the third aspect, and one or more filler selected from talc mineral filler, wollastonite, calcium carbonate, modified calcium carbonate, coated calcium carbonate, glass fibres, wood fibres, bamboo fibres, flax fibres, hemp fibres, carbon fibres, metal fibres, graphite fibres, silica fibres, silica-alumina fibres, alumina fibres, zirconia fibres, boron nitride fibres, silicon nitride fibres, boron fibres, potassium titanate whisker, aluminium borate whisker, magnesium-based whisker, silicon-based whisker, carbon black, carbon nanotubes, graphene nanotubes, and any mixture thereof.

With preference the composite material is a wood-plastic composite comprising the modified polyethylene composition according to the second or the third aspect and wood fibers.

According to a sixth aspect the disclosure relates to a multi-layered article characterized in that it comprises at least one layer comprising the modified polyethylene composition according to the second or the third aspect and at least one barrier layer wherein the barrier layer comprises ethylene-vinyl alcohol copolymer or a metallic material selected from aluminium or stainless steel; with preference, the multi-layered article is selected from a pipe or a film or a food-packaging.

According to a seventh aspect, the disclosure relates to a method to produce a composite material remarkable in that it comprises producing a modified polyethylene composition from a polyethylene-containing material according to the process according to the first aspect and producing a composite material using the modified polyethylene composition obtained by said process, (or using the polyethylene composition according to the second aspect); with preference, the polyethylene-containing material is a recycled polyethylene-containing material.

According to another aspect, the disclosure relates to a method to produce a composite material remarkable in that it comprises in a first step producing a modified polyethylene composition from a polyethylene-containing material according to the process as defined into the first aspect or providing a modified polyethylene composition according to the second or third aspect, and in a second step melt-blending the modified polyethylene composition with one or more fillers to produce a composite material further comprising one or more fillers; with preference, the polyethylene-containing material is a recycled polyethylene-containing material.

DESCRIPTION OF THE FIGURES

FIG. 1 is an example of a screw profile that can be used in the context of the disclosure.

FIG. 2 is another example of a screw profile that can be used in the context of the disclosure.

DETAILED DESCRIPTION

Figure 3:
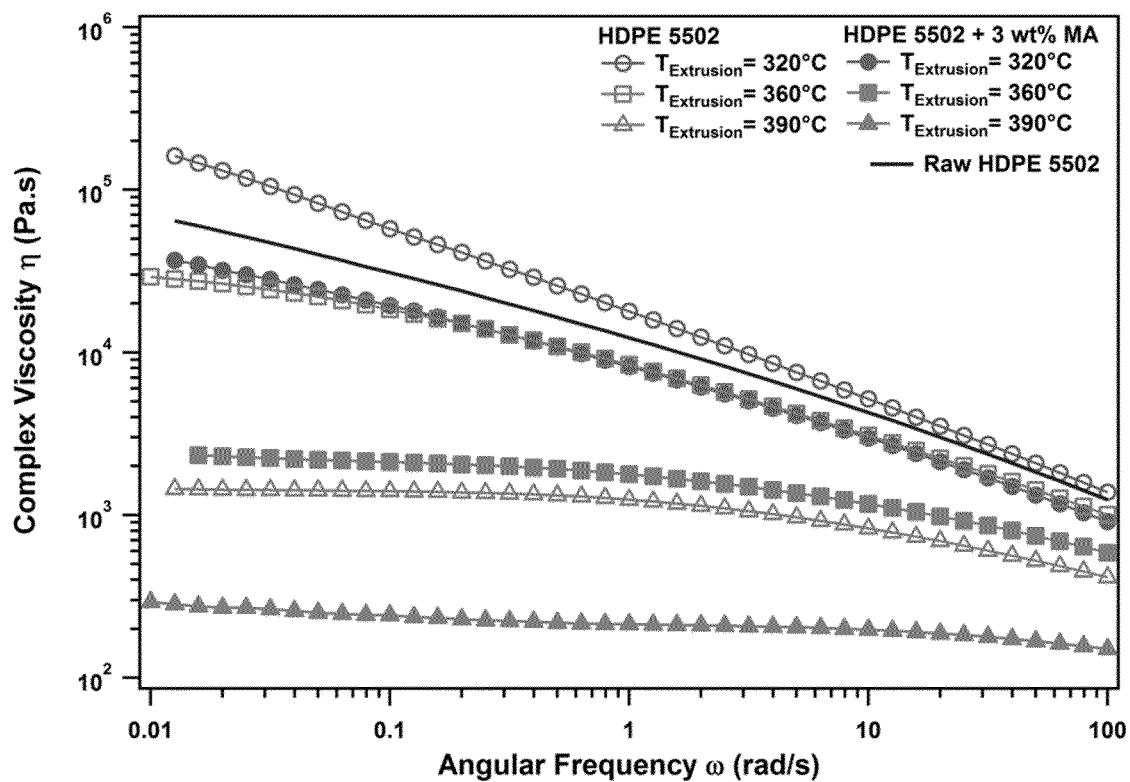
FIG. 3 is the Frequency sweeps for the experiments of screw profile "P1". Complex viscosity as a function of the angular frequency (190° C., under nitrogen flow).
Figure 4:
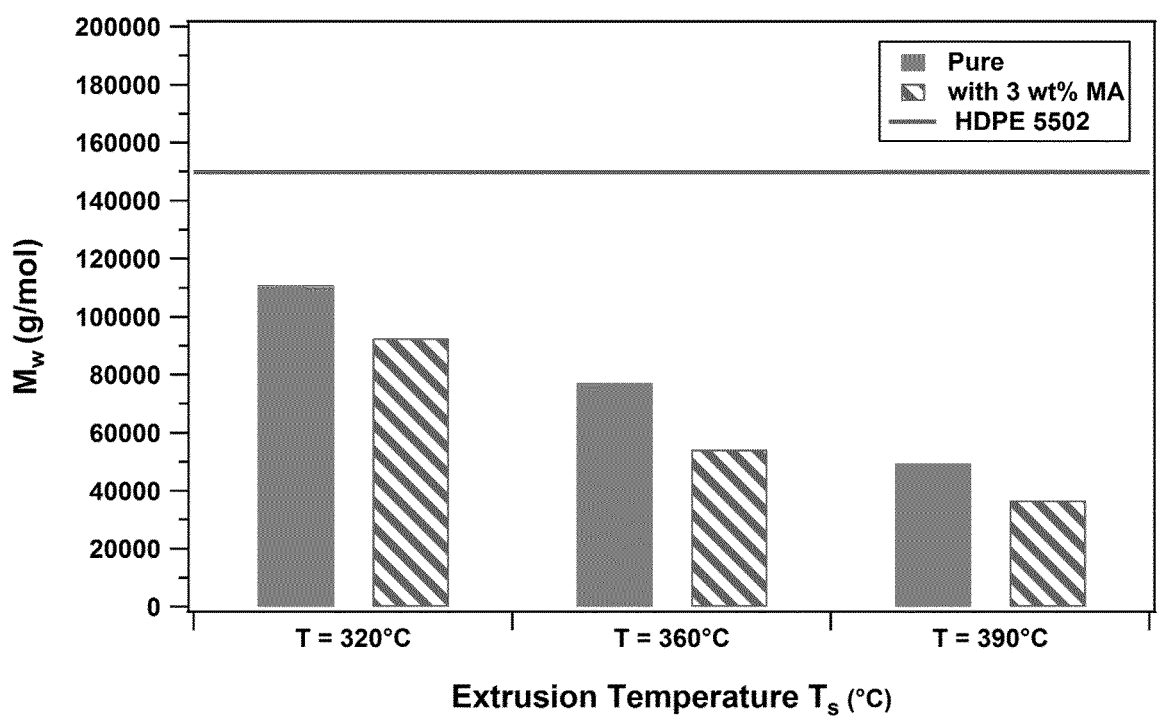
FIG. 4 is Weight average Molar Mass obtained from size exclusion chromatography as a function of the extrusion temperature (Ts) in the high temperature zone for pure and grafted products (HDPE 5502). The molar masse of pure HDPE 5502 (reference) is plotted as a line on the whole range for comparison purposes.
Figure 5:
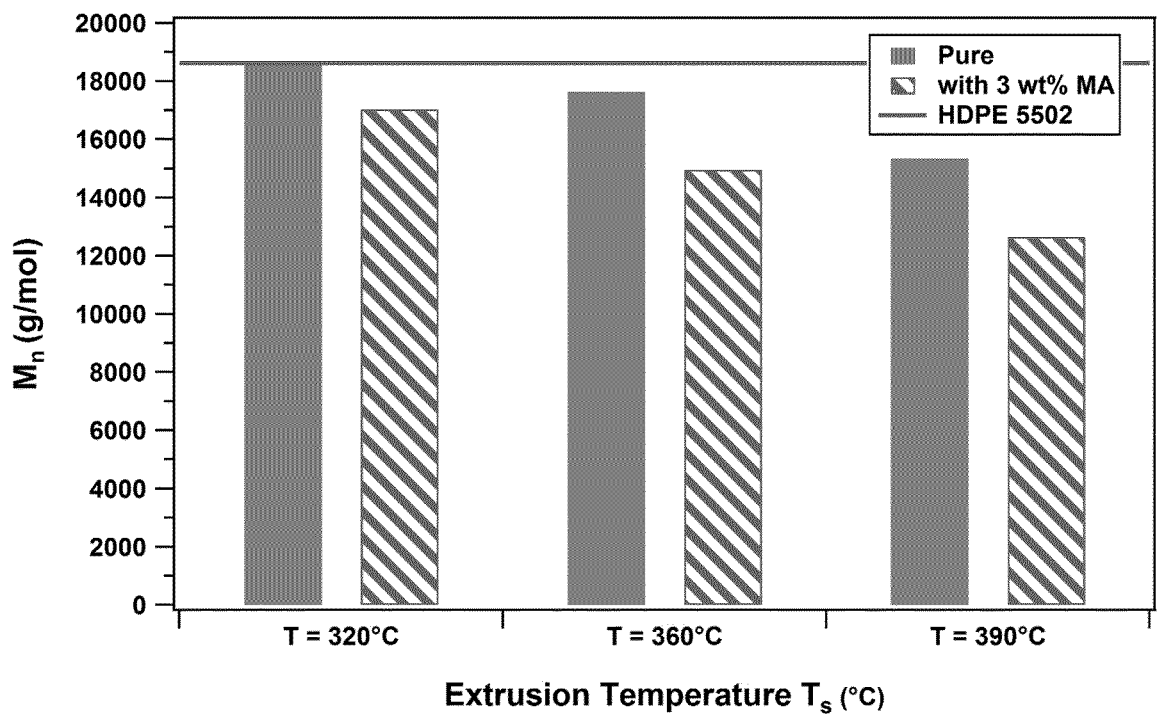
FIG. 5 is Number average molar mass obtained from size exclusion chromatography as a function of the extrusion temperature (Ts) in the high temperature zone for pure and grafted products (HDPE 5502). The molar masse of pure HDPE 5502 (reference) is plotted as a line on the whole range for comparison purposes.
Figure 6:
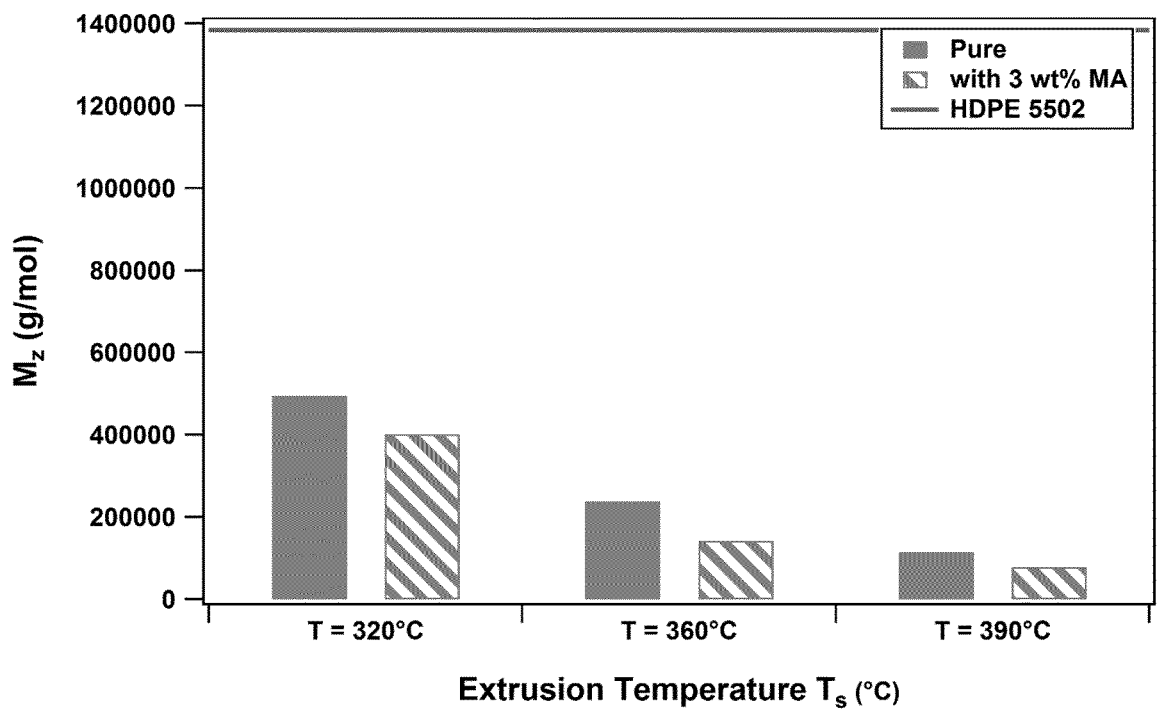
FIG. 6 is Z average molar mass obtained from size exclusion chromatography as a function of the extrusion temperature (Ts) in the high temperature zone for pure and grafted products (HDPE 5502). The molar masse of pure HDPE 5502 (reference) is plotted as a line on the whole range for comparison purposes.
Figure 7:
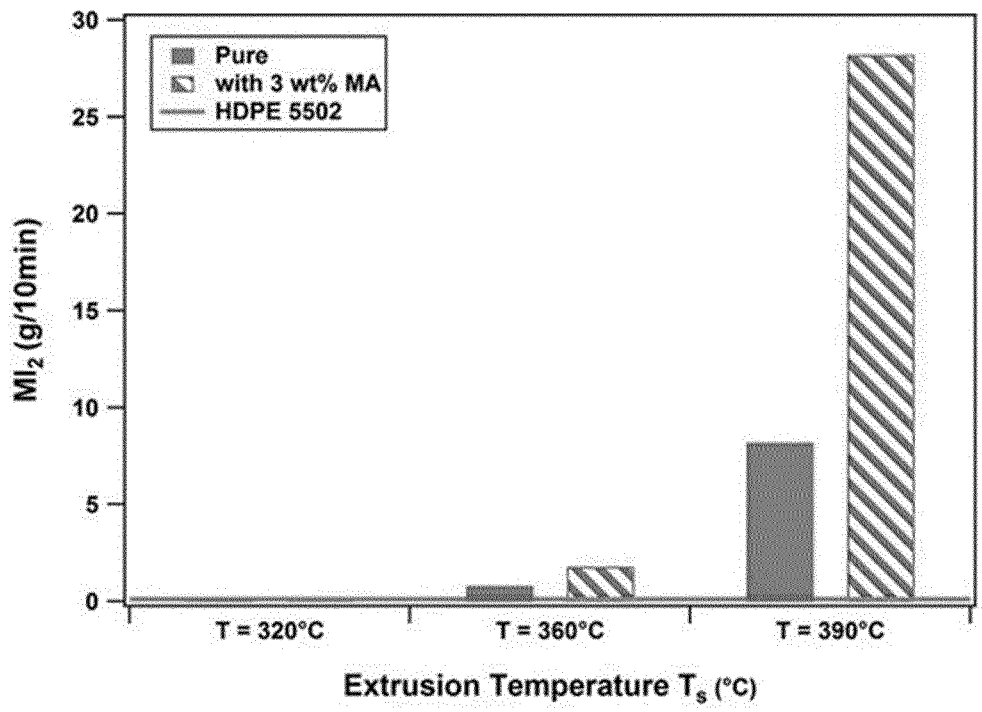
FIG. 7 is Melt flow index determined following ISO 1133-2005 at 190° C. under a load of 2.16 kg as a function of the extrusion temperature for pure and grafted products. The MI2 of pure HDPE 5502 (reference) is plotted as a line on the whole range for comparison purposes.
Figure 8:
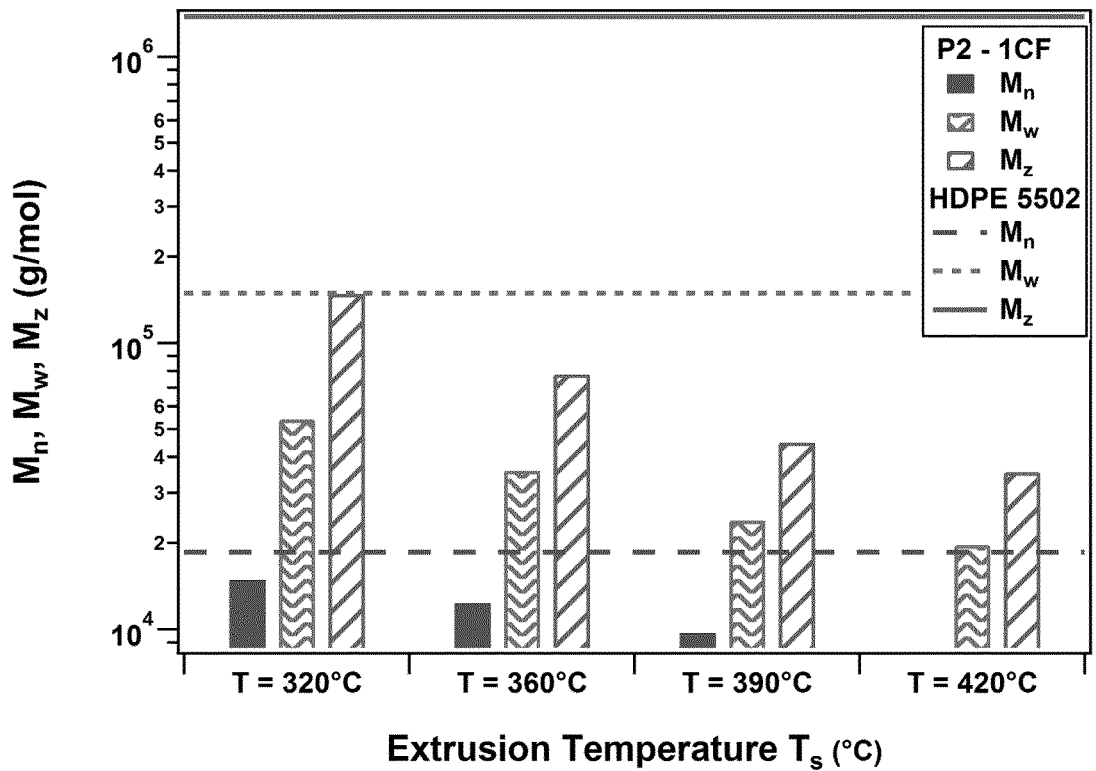
FIG. 8 is Number average molar mass, weight average Molar Mass, and Z average molar mass obtained from size exclusion chromatography as a function of the extrusion temperature (Ts) in the high temperature zone for grafted products using P2-1CF screw profile at 400 rpm. The respective molar masses of pure HDPE 5502 (reference) are plotted as a dashed lines on the whole range for comparison purposes.
Figure 9:
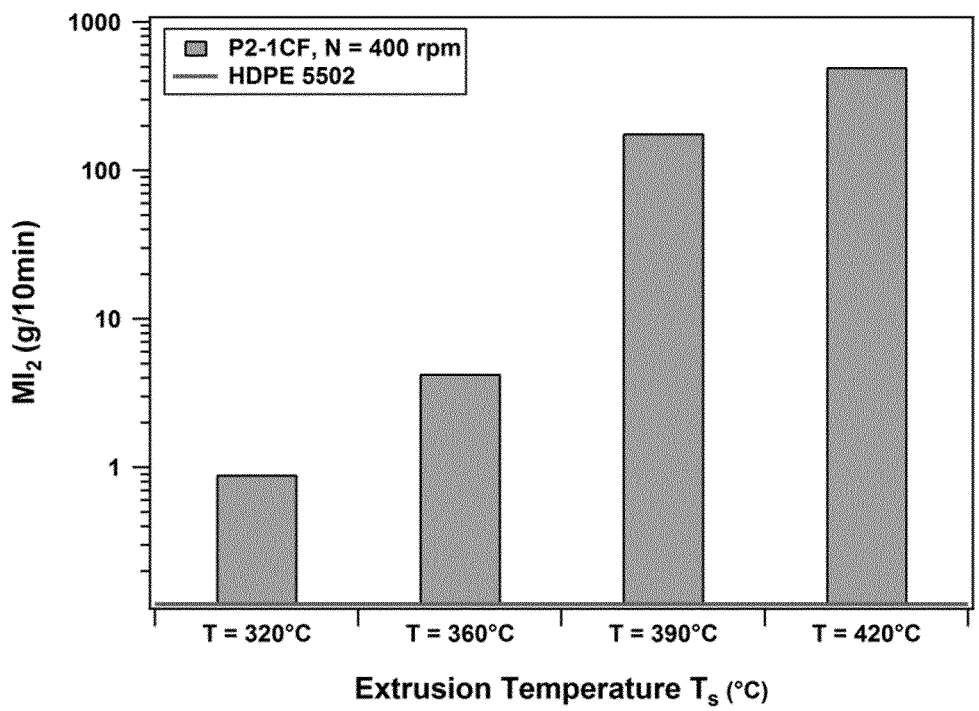
FIG. 9 is Melt flow index determined following ISO 1133-2005 at 190° C. under a load of 2.16 kg as a function of the extrusion temperature for grafted products using the screw profile P2-1CF at 400 rpm. The MI2 of pure HDPE 5502 (reference) is plotted as a line on the whole range for comparison purposes.

It is to be understood that this disclosure is not limited to particular processes or compositions described, as such processes or compositions may, of course, vary. It is also to be understood that the terminology used herein is not intended to be limiting since the scope of the present disclosure will be limited only by the appended claims.

When describing the polymers, uses and processes of the disclosure, the terms employed are to be construed by the following definitions, unless a context dictates otherwise. For the disclosure, the following definitions are given:

As used herein, the singular forms "a", "an", and "the" include both singular and plural referents unless the context dictates otherwise. By way of example, "a composition" means one composition or more than one composition.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g., 1 to 5 can include 1, 2, 3, 4, 5 when referring to, for example, a number of elements, and can also include 1.5, 2, 2.75 and 3.80, when referring to, for example, measurements). The recitation of endpoints also includes the endpoint values themselves (e.g., from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference. Indication of a standard method to determine a parameter implies referring to the standard in force at the priority date of the application, in case the year of the standard is not indicated.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art. For example, in the following claims and statements, any of the embodiments can be used in any combination.

Unless otherwise defined, all terms used in disclosing the disclosure, including technical and scientific terms, have the meaning as commonly understood by one of ordinary skill in the art to which this disclosure belongs. By means of further guidance, definitions for the terms used in the description are included to better appreciate the teaching of the present disclosure.

The terms "polyethylene" (PE) and "ethylene polymer" may be used synonymously. The term "polyethylene" encompasses ethylene homopolymer as well as ethylene copolymer resin which can be derived from ethylene and one or more comonomers selected from the group consisting of C3-C20 alpha-olefins, such as propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene.

The terms "polyethylene resin" or "ethylene homopolymer resin" or "ethylene copolymer resin" refer to polyethylene fluff or powder that is extruded, and/or melted and/or pelletized and can be produced through compounding and homogenizing of the polyethylene resin as taught herein, for instance, with mixing and/or extruder equipment. As used herein, the term "polyethylene" may be used as a shorthand for "polyethylene resin". The terms "fluff" or "powder" refer to polyethylene material with the hard catalyst particle at the core of each grain and is defined as the polymer material after it exits the polymerization reactor (or the final polymerization reactor in the case of multiple reactors connected in series).

The terms "Post-Consumer Resin", which may be abbreviated as "PCR", is used to denote the components of domestic waste, household waste or end of life vehicle waste. In other words, the PCRs are made of recycled products from waste created by consumers. The terms "Post-Industrial Resin", which may be abbreviated as "PIR", is used to denote the waste components from pre-consumer resins during packaging processes. In other words, the PIRs are made of recycled products created from scrap by manufacturers.

The term "recycled polyethylene composition" or "recycled polyethylene-containing material" contrasts to the term "virgin polyethylene composition" "virgin polyethylene-containing material", the term "virgin" is used to denote a polyethylene composition or material directly obtained from a polyethylene-containing polymerization plant. The terms "directly obtained" is meant to include that the polyethylene composition may optionally be passed through a pelletization step or an additivation step or both.

Under normal production conditions in a production plant, it is expected that the melt index (MI2, HLMI, MI5) will be different for the fluff than for the polyethylene-containing resin. Under normal production conditions in a production plant, it is expected that the density will be slightly different for the fluff than for the polyethylene-containing resin (if PCR resins are considered, it is not a question of fluff (powder) or pellets but it is a question of flakes or pellets). Unless otherwise indicated, density and melt index for the polyethylene-containing resin refer to the density and melt index as measured on the polyethylene-containing resin as defined above.

The present disclosure provides a process for the treatment of a polyethylene-containing material to produce a modified polyethylene composition. The process, the polyethylene-containing material and the modified polyethylene composition produced by such process will be described jointly.

According to the disclosure, the process for grafting of a polyethylene-containing material to produce a modified polyethylene composition characterized in that it comprises the following steps:
  a) providing a twin screw extruder with one or more thermal regulation devices;
  b) providing a polyethylene-containing material comprising at least 50 wt. % of polyethylene based on the total weight of the polyethylene-containing material;
  c) providing a grafting agent in a content ranging from 0.8 to 10.0 wt. % based on the total weight of the polyethylene-containing material provided on step (b), wherein the grafting agent comprises at least one double bound per molecule;
  d) extruding the polyethylene-containing material and the grafting agent to obtain a modified polyethylene composition; wherein step (d) of extruding comprises a thermal treatment of the polyethylene-containing material at a maximum barrel temperature Ts ranging from 315° C. to 410° C. in one or more hot zones of the extruder wherein the thermal treatment is performed by self-heating of the material; and
  e) recovering a modified polyethylene composition.

For example, the maximum barrel temperature Ts ranging from 315° C. to 410° C. in step (d) is obtained by self-heating of the material wherein the extruder is a twin screw extruder and the one or more hot zones have a total length equal to or greater than 6 D with D being the screw diameter, wherein the extrusion is performed with mechanical specific energy greater than or equal to 0.30 kWh/kg, wherein the screw profile comprises at least one hot zone with successive kneading blocks elements over a length of at least 4 D followed by a left-handed element with D being the screw diameter, wherein the thermal regulation devices, are set to initial imposed barrel temperatures ranging between 24° and 320° C., and are switched off when the barrel temperature in the zone spontaneously exceeds the imposed barrel temperature by at least 3° C. without the need of external heat application.

The process of grafting polyethylene-containing material involves increasing the melt index of the said polyethylene-containing material to produce a modified polyethylene composition with a melt index that is increased by a factor k of more than 2.0; preferably by a factor k of at least 3.0; preferably by a factor k of at least 5.0; preferably by a factor k of at least 6.0; preferably by a factor k of at least 8.0; preferably by a factor k of at least 10.0; preferably by a factor k of at least 15.0; preferably by a factor k of at least 20.0; preferably by a factor k of at least 40.0.

So that the ratio of the melt index of the modified polyethylene composition ($MI_2$ T) to the melt index of the polyethylene-containing material ($MI_2$ R) is more than 2.0; preferably of at least 3.0, preferably by at least 5.0; preferably at least 6.0; preferably at least 8.0; preferably at least 10.0; preferably at least 15.0; preferably at least 20.0; preferably at least 40.0.

The Extruder with One or More Thermal Regulation Devices and the Step (d) of Extruding the Polyethylene-Containing Material to Obtain a Modified Polyethylene Composition The treatment of the polyethylene-containing material to obtain a modified polyethylene composition is performed by extrusion wherein step (d) of extruding comprises a thermal treatment of the polyethylene-containing material at a maximum barrel temperature Ts of at least 315° C. and at most 410° C. in one or more hot zones of the extruder; preferably wherein extrusion is performed with a residence time of less than 10 min.

The extruder is a twin-screw extruder. The extruder is a twin-screw extruder provided with a screw profile that shows an aggressive design, as shown in FIG. 1, to impart high mechanical energy to the polyethylene-containing material.

As known to the person skilled in the art, thermal regulation devices can be used as heating means to impart thermal energy to the polyethylene-containing material in the extruder, in addition to the thermal energy already generated by the mixing.

Extrusion mixing varies with the type of screw and screw profile and is capable of significant generation of mechanical energy, such as shear energy and/or elongation energy. Therefore, energy is introduced into the extrusion process in terms of mechanical energy and thermal energy. Heating and/or cooling of the barrels can be achieved, for example, electrically, by steam, or by the circulation of thermally controlled liquids such as oil or water.

The extruder screw comprises a screw main body, that is composed of cylindrical elements and an axis of rotation supporting the elements. The axis of rotation extends straight from its basal end to its tip. In a state in which the extruder screw is rotatably inserted in the cylinder of the barrel, the basal end of the extruder screw is positioned on one end side of the barrel, on which the supply port is provided, and the tip of the extruder screw is positioned on the other end side of the barrel, on which the discharge port is provided.

Screw extruders have a modular system that allows different screw elements to be drawn into the central shaft to build a defined screw profile. The extruder screw may comprise one or more elements selected from conveying elements, kneading elements, right-handed (normal) screw elements, left-handed (inverse) screw elements and any combination thereof. The elements are arranged in a defined order from the basal end to the tips of the extruder screw and this order, as well as the type and number of elements involved, defines the screw profile. Extruders and screw elements are commercially available for example at Leistritz.

In an embodiment of the disclosure, the treatment of the polyethylene-containing material is handled by mechanical energy.

When high mechanical energy is requested, the extruder provided has a specific screw profile that is built to be "aggressive", meaning that high mechanical energy will be imparted to the polyethylene-containing material. High mechanical energy will result in an increase of the temperature in the extruder as known to the person skilled in the art so that the thermal treatment is performed by self-heating of the material. Self-heating of the material is achieved from viscous dissipation in a twin-screw extruder.

In such an embodiment, the twin-screw extruder is selected to comprise one or more hot zones, preferably being filled mixing zones, wherein the total length of the one or more hot zones is equal to or greater than 6 D with D being the screw diameter.

It is understood that in case the screw profile is selected to comprise a single hot zone, then the total length of the said hot zone is equal to or greater than 6 D with D being the screw diameter. In such a case, the hot zone is also the melting zone of the twin-screw extruder.

In case, the screw profile comprises two or more hot zones, then a first hot zone comprises successive kneading blocks elements over a length of at least 4 D followed by a left-handed element with D being the screw diameter, and one or more additional hot zones placed downstream the first hot zone are filled mixing zones, each comprising kneading blocks elements over a length of at least 4 D followed by a kneading left-handed element or by a left-handed element with D being the screw diameter. For example, the twin-screw extruder comprises two filled mixing zones wherein each of the filled mixing zones has a length equal to or greater than 4 D with D being the screw diameter. Preferably the first hot zone is or comprises the melting zone of the extruder.

Various mixing elements could be considered in the one or more hot zones but the most preferred ones do not drive any forward conveying (dispersive kneading blocks elements with disks offset by 90 degrees). Other disk offset angles could be considered (examples 30 degrees, 45 degrees, 60 degrees) but 90 degrees is preferred. The preferred minimum width of the disk is 0.3 D.

Thus, preferably, the successive kneading blocks elements of at least one hot zone comprise disks with disks offset by 90 degrees and a disk width of at least 0.3 D wherein D is the screw diameter.

For example, the twin-screw extruder comprises more than two filled mixing zones wherein the total length filled mixing zones is equal to or greater than 8 D with D being the screw diameter.

For example, the strong melting zone of the twin-screw extruder is made of successive mixing elements over a length of 4 D, with D being the screw diameter, followed by a left-handed element; preferably a full flight left-handed element.

In a preferred embodiment, the thermal regulation devices of twin-screw extruder allow cooling the barrels and the process comprises switching off the thermal regulation devices when the barrel temperature in the zone spontaneously exceeds the imposed barrel temperature by at least 1° C. without the need of external heat application; preferably, by at least 2° C., preferably, by at least 3° C.; more preferably by at least 5° C.; even more preferably, by at least 8° C.; and most preferably, by at least 10° C.

Indeed, when starting extrusion, thermal regulation devices will be switched on, in particular in the melting zone to allow the material to melt. Then, when the polymer is self-heating the thermal regulation devices are switched off to allow the increase of the temperature inside the extruder.

In a preferred embodiment, step (d) of extruding the polyethylene-containing material comprises performing the extrusion with mechanical specific energy greater than or equal to 0.30 kWh/kg, preferably greater than or equal to 0.35 kWh/kg; more preferably greater than or equal to 0.40 kWh/kg; even more preferably greater than or equal to 0.45 kWh/kg; most preferably greater than or equal to 0.50 kWh/kg and even most preferably greater than or equal to 0.60 kWh/kg.

High rotation screw speeds are preferred, but the precise value of a high rotation screw speed is "extruder diameter" dependent. For example, when considering a diameter D of 18 mm twin-screw extruder, high rotational screw speed is considered to be higher than 500 rpm, preferably higher than 800 rpm. For example, when considering a diameter D=58 mm twin-screw extruder, high rotational screw speed is considered to be higher than 250 rpm, preferably higher than 350 rpm.

Non-limiting examples of suitable extruder screws with specific screw profiles are illustrated in FIGS. 1 and 2.

In such an embodiment, step (d) is performed a maximum barrel temperature of at least 315° C.; preferably at least 320° C.; more preferably at least 330° C.; even more preferably at least 340° C., and most preferably at a temperature of at least 350° C., or at a temperature of at least 360° C.

For example, step (d) of extruding the polyethylene-containing material comprises a thermal treatment at a maximum barrel temperature of at most 410° C. in at least one hot zone; preferably at a temperature of at most 405° C.; more preferably at a temperature of at most 400° C.; even more preferably at a temperature of at most 395° C. and most preferably at a temperature of at least 390° C.

The thermal treatment of material in step (d) is preferably performed a maximum barrel temperature ranging from 315 to 410° C.; preferably, ranging from 320° C. to 405° C.; more preferably ranging from 330° C. to 405° C.; even more preferably, ranging from 340° C. to 400° C.; most preferably at a maximum barrel temperature ranging from 360 to 400° C. and even most preferably at a maximum barrel temperature ranging from 340 to 395° C. or ranging from 350° C. to 395° C., or at a maximum barrel temperature ranging from 320 to 390° C. The maximum barrel temperature Ts is the highest temperature amongst the imposed or measured temperatures along the extruder.

The extrusion conditions may be adapted by the person skilled in the art to impart sufficient energy to obtain a modified polyethylene composition with a melt index ($MI_2$ T) in the targeted range.

Screw speed can be adapted in function of the targeted maximum barrel temperature Ts and of the capacity of the extruder. Higher screw speed allows a higher increase of the polymer temperature. For example, the screw speed ranging from 100 to 1200 rpm; preferably from 110 rpm to 1200 rpm; more preferably from 150 rpm to 1100 rpm; even more preferably from 200 rpm to 1000 rpm; most preferably from 300 rpm to 900 rpm; and even most preferably from 320 to 800 rpm or from 350 to 1200 rpm.

In an 18 mm screw diameter twin-screw extruder, the preferred screw speed is higher than 500 rpm; in a 58 mm screw diameter twin-screw extruder, the preferred screw speed is higher than 250 rpm.

For example, step (d) of extruding the polyethylene-containing material comprises performing the extrusion with a residence time of less than 10 minutes, such as ranging from 10 seconds to 10 minutes; preferably with a residence time ranging from 20 seconds to 5 minutes; more preferably with a residence time ranging from 10 to 180 seconds or from 10 to 120 seconds or from 20 to 100 seconds or from 30 to 80 seconds.

For example, the extruder comprises one or more venting parts at the end of the extruder (before the die). Such venting parts, connected to a vacuum pump, allows removing at least a part of the unreacted grafting agent.

For example, the extruder is selected to have a surface treatment. For example, one or more elements of the extruder are made of CrVNb microalloyed steel. Extruders with surface treatments are commercially available from Leistritz.

The Polyethylene-Containing Material and the Step b) of Providing a Polyethylene-Containing Material The process according to the disclosure comprises a step (b) of providing a polyethylene-containing material comprising at least 50 wt. % of polyethylene based on the total weight of the polyethylene-containing material.

The polyethylene-containing material can be a virgin polyethylene-containing material, a recycled polyethylene-containing material or a mixture of virgin and recycled polyethylene-containing materials. In some embodiments, the polyethylene-containing material is a recycled polyethylene-containing material. As used herein, the terms "recycled polyethylene composition" encompasses both Post-Consumer Resins (PCR) and Post-Industrial Resins (PIR).

Suitable polyethylene includes but is not limited to homopolymer of ethylene, copolymer of ethylene and a higher alpha-olefin comonomer. Thus, preferably, the polyethylene in the polyethylene-containing material is one or more polyethylene homopolymers, one or more polyethylene copolymers, and any mixture thereof.

The term "copolymer" refers to a polymer, which is made by linking two different types of monomers in the same polymer chain. Preferred comonomers are alpha-olefins having from 3 to 20 carbon atoms or from 3 to 10 carbon atoms. More preferred comonomers are selected from the group comprising propylene, butene-1, pentene-1, hexene-1, heptene-1, octene-1, nonene-1, decene-1 and any mixture thereof. Even more preferred comonomers are selected from the group comprising butene-1, hexene-1, octene-1 and any mixture thereof. The most preferred comonomer is hexene-1.

The term "homopolymer" refers to a polymer that is made by linking only one monomer in the absence of comonomers. Ethylene homopolymers are therefore essentially without any comonomer. By "essentially without" is meant that no comonomer is intentionally added during the production of the polyethylene, but can nevertheless be present in up to 0.2 wt. %, preferably in up to 0.1 wt. % and most preferably in up to 0.05 wt. %, relative to the total weight of the polyethylene.

The polyethylene-containing material is selected to comprise at least 20 wt. % of polyethylene based on the total weight of the polyethylene-containing material; preferably at least 25 wt. %; more preferably at least 30 wt. %, even more preferably at least 40 wt. % and most preferably at least 50 wt. % of polyethylene based on the total weight of the polyethylene-containing material. With preference, the polyethylene-containing material is selected to comprise at least 55 wt. % of polyethylene based on the total weight of the polyethylene-containing material; preferably, at least 60 wt. %; preferably, at least 70 wt. %; preferably, at least 80 wt. %; preferably, at least 90 wt. %; preferably, at least 95 wt. %. In an embodiment, the polyethylene-containing material is a virgin material and consists of polyethylene (i.e. comprises 100 wt. % of polyethylene).

In an embodiment, the polyethylene-containing material is a recycled polyethylene-containing material. Recycled polyethylene-containing material may contain one or more polymers different from polyethylene.

In an embodiment, and in particular wherein the polyethylene-containing material is a recycled polyethylene-containing material; the polyethylene-containing material comprises at least one polymer different from polyethylene in a content ranging from 0 to 80 wt. % of the based on the total weight of the polyethylene-containing material wherein at least one polymer different from polyethylene is selected from polypropylene (PP), polyacrylate (PA), polyethylene terephthalate (PET), polystyrene (PS), polylactic acid (PLA), and any mixture thereof; preferably from 0.1 to 75 wt. %; more preferably from 0.5 to 70 wt. % and even more preferably from 1 to 60 wt. %.

For example; the polyethylene-containing material comprises at least one polymer different from polyethylene in a content ranging from 0 to 50 wt. % of the based on the total weight of the polyethylene-containing material wherein at least one polymer different from polyethylene is selected from polypropylene (PP), polyacrylate (PA), polyethylene terephthalate (PET), polystyrene (PS), polylactic acid (PLA), and any mixture thereof.

With preference, the polyethylene-containing material comprises at least one polymer different from polyethylene in a content ranging from 0 to 40 wt. % of the based on the total weight of the polyethylene-containing material; preferably from 0.1 to 20 wt. %; more preferably from 0.2 to 10 wt. %; and even more preferably from 0.5 to 5 wt. %.

For example, PCR polyethylene classically contain a small part of polypropylene (such as less than 5 wt %).

In an embodiment, the polyethylene-containing material, or the polyethylene in the polyethylene-containing material, has a high load melt index (HLMI R) of at least 1.0 g/10 min as determined according to ISO 1133-2011 at 190° C. under a load of 21.6 kg; preferably at least 1.2 g/10 min; more preferably at least 1.5 g 10 min.

In an embodiment, the polyethylene-containing material, or the polyethylene in the polyethylene-containing material, has a melt index ($MI_2$ R) of at least 0.10 g/10 min as determined according to ISO 1133-2011 at 190° C. under a load of 2.16 kg; preferably at least 0.15 g/10 min; more preferably at least 0.2 g/10 min; even more preferably at least 0.5 g/10 min. most preferably at least 0.8 g/10 min and even most preferably at least 0.9 g/10 min, or at least 1.0 g/10 min.

For example, the polyethylene-containing material is selected to have a melt index ranging from a high load melt index (HLMI R) as determined according to ISO 1133-2011 at 190° C. under a load of 21.6 kg of at least 1.0 g/10 min to a melt index ($MI_2$ R) of at most 3.0 g/10 min as determined according to ISO 1133-2011 at 190° C. under a load of 2.16 kg.

In an embodiment the polyethylene-containing material, or the polyethylene in the polyethylene-containing material, has a melt index ($MI_2$ R) of at most 3.0 g/10 min as determined according to ISO 1133-2011 at 190° C. under a load of 2.16 kg; preferably at most 2.8 g/10 min; more preferably at most 2.5 g/10 min; even more preferably at most 2.2 g/10 min. most preferably at most 2.0 g/10 min and even most preferably at most 1.8 g/10 min, or at most 1.6 g/10 min.

For example, the polyethylene-containing material, or the polyethylene in the polyethylene-containing material, has a density of at least 0.910 $g/cm^3$ as determined according to ISO 1183-1:2012 at 23° C.; preferably, at least 0.915 $g/cm^3$.

In an embodiment, the polyethylene-containing material is selected to have a high load melt index (HLMI R) of at least 1.0 g/10 min as determined according to ISO 1133-2011 at 190° C. under a load of 21.6 kg, a melt index ($MI_2$ R) of at most 0.45 g/10 min as determined according to ISO 1133-2011 at 190° C. under a load of 2.16 kg and a density of at least 0.940 $g/cm^3$ as determined according to ISO 1183-1:2012 at 23° C.

For example, the polyethylene-containing material, or the polyethylene in the polyethylene-containing material, has a density of at least 0.940 g/cm³ as determined according to ISO 1183-1:2012 at 23° C.; preferably, at least preferably, at least 0.945 g/cm³; more preferably, at least 0.948 g/cm³; even more preferably of at least 0.950 g/cm³; and most preferably, of at least 0.951 g/cm³.

For example, the polyethylene-containing material, or the polyethylene in the polyethylene-containing material, has a density of at most 0.965 g/cm³ as determined according to ISO 1183-1:2012 at 23° C.; preferably, of at most 0.962 g/cm³; and more preferably, of at most 0.960 g/cm³.

For example, the polyethylene-containing material, or the polyethylene in the polyethylene-containing material, has a density ranging from 0.940 g/cm³ to 0.965 g/cm³ as determined according to ISO 1183-1:2012 at 23° C.; preferably, ranging from 0.942 g/cm³ to 0.964 g/cm³; more preferably, ranging from 0.945 g/cm³ to 0.962 g/cm³; and even more preferably, ranging from 0.948 g/cm³ to 0.960 g/cm³.

For example, the polyethylene-containing material, or the polyethylene in the polyethylene-containing material, has a melt index ranging from a high load melt index (HLMI R) as determined according to ISO 1133-2011 at 190° C. under a load of 21.6 kg of at least 1.0 g/10 min to a melt index ($MI_2$ R) of at most 0.45 g/10 min as determined according to ISO 1133-2011 at 190° C. under a load of 2.16 kg.

For example, the polyethylene-containing material, or the polyethylene in the polyethylene-containing material, has a high load melt index (HLMI R) of at least 1.0 g/10 min as determined according to ISO 1133-2011 at 190° C. under a load of 21.6 kg; preferably at least 1.2 g/10 min; more preferably at least 1.5 g/10 min.

For example, the polyethylene-containing material, or the polyethylene in the polyethylene-containing material, has a melt index ($MI_2$ R) of at most 0.45 g/10 min as determined according to ISO 1133-2005 at 190° C. under a load of 2.16 kg; preferably, at most 0.42 g/10 min; more preferably at most 0.40 g/10 min; even more preferably ranging at most 0.35 g/10 min.

In another embodiment, the polyethylene-containing material is selected to have a melt index ($MI_2$ R) ranging from 0.8 to 1.5 g/10 min as determined according to ISO 1133-2011 at 190° C. under a load of 2.16 kg and a density of ranging from 0.910 g/cm³ to less than 0.940 g/cm³ as determined according to ISO 1183-1:2012 at 23° C.; preferably from 0.910 g/cm³ to 0.935 g/cm³ or from 0.910 g/cm³ to 0.930 g/cm³.

With preference, the polyethylene-containing material, or the polyethylene in the polyethylene-containing material, has a density of at least 0.910 g/cm³ as determined according to ISO 1183-1:2012 at 23° C.; preferably, at least preferably, at least 0.912 g/cm³; more preferably, at least 0.915 g/cm³; and even more preferably of at least 0.916 g/cm³.

For example, the polyethylene-containing material, or the polyethylene in the polyethylene-containing material, has a density of less than 0.940 g/cm³ or at most 0.935 g/cm³ or at most 0.930 g/cm³ as determined according to ISO 1183-1:2012 at 23° C.; preferably, of at most 0.928 g/cm³; and more preferably, of at most 0.925 g/cm³.

For example, the polyethylene-containing material, or the polyethylene in the polyethylene-containing material, has a density ranging from 0.910 g/cm³ to less than 0.940 g/cm³ as determined according to ISO 1183-1:2012 at 23° C.; preferably from 0.910 g/cm³ to 0.935 g/cm³ or from 0.910 g/cm³ to 0.930 g/cm³; preferably, ranging from 0.912 g/cm³ to 0.928 g/cm³; more preferably, ranging from 0.915 g/cm³ to 0.925 g/cm³; and even more preferably, ranging from 0.916 g/cm³ to 0.925 g/cm³.

For example, the polyethylene-containing material, or the polyethylene in the polyethylene-containing material, has a melt index ($MI_2$ R) ranging from 0.8 to 1.5 g/10 min as determined according to ISO 1133-2011 at 190° C. under a load of 2.16 kg; preferably, ranging from 0.8 to 1.4 g/10 min; more preferably ranging from 0.9 to 1.3 g/10 min; even more preferably ranging from 1.0 to 1.2 g/10 min.

In some embodiments, the polyethylene-containing material or the polyethylene in the polyethylene-containing material has an Mz/Mw of at least 4.0 as determined by gel permeation chromatography; preferably, ranging from 4.0 to 50.0; preferably, from 5.0 to 25.0; preferably, from 7.0 to 15.0.

In some embodiments, the polyethylene-containing material or the polyethylene in the polyethylene-containing material, has a complex viscosity at 0.1 rad/sec at 190° C. of ranging from 20,000 to 80,000 Pa·s; preferably, ranging from 22,000 to 70,000 Pa·s; more preferably, ranging from 25,000 to 60,000 Pa·s; and even more preferably, ranging from 30,000 to 50,000 Pa·s.

In some embodiments, the polyethylene-containing material or the polyethylene in the polyethylene-containing material, has an Mw/Mn ranging from 5.0 to 30.0 as determined by gel permeation chromatography; preferably ranging from 6.0 to 20.0; preferably ranging from 7.0 to 15.0.

In some embodiments, the polyethylene-containing material or the polyethylene in the polyethylene-containing material, has a complex viscosity ratio above 10; preferably, a complex viscosity ratio of at least 11; more preferably, a complex viscosity ratio of at least 12.

The Grafting Agent and the Step (c) of Providing a Grafting Agent

The process according to the disclosure comprises a step (c) of providing a grafting agent comprising at least one double bond per molecule. For example, the grafting agent comprises at least one vinyl group per molecule.

For example, the grafting agent comprises or consists in one or more functional monomers selected between from maleic anhydride (MAH), glycidyl methacrylate (GMA), methyl methacrylate (MMA), acrylic acid (AAc), butyl acrylate (BA) vinyl acetate (VA), diethyl maleate (DEM), acrylamide (AAm), acrylonitrile (CAN), and any mixture thereof. With preference, the grafting agent is or comprises maleic anhydride (MAH).

The grafting agent is provided in a content ranging from 0.1 to 10.0 wt. % or from 0.5 to 10.0 wt. % or from 0.8 to 10.0 wt. % based on the total weight of the polyethylene-containing material; preferably, from 0.9 to 8.0 wt. %; more preferably, from 1.0 to 6.0 wt. %; even more preferably, from 1.1 to 5.5 wt. %; most preferably, from 1.2 to 5.0 wt. %; even most preferably, from 1.3 to 4.5 wt. %; or from 1.5 to 4.0 wt. %; or from 2.0 to 5.0 wt. %.

For example, the grafting agent is provided in a content of at least 0.1 wt. % or at least 0.2 wt. % or at least 0.5 wt. % or at least 0.7 wt. % or at least 0.8 wt. % or at least 0.9 wt. % based on the total weight of the polyethylene-containing material; preferably, at least 1.0 wt. %; more preferably at least 1.1 wt. %; even more preferably at least 1.2 wt. %; most preferably at least 1.3 wt. % and even most preferably at least 1.5 wt. % or at least 1.8 wt. %; or at least 2.0 wt. %.

For example, the grafting agent is provided in a content of at most 10.0 wt. % or at most 8.0 wt. % based on the total weight of the polyethylene-containing material; preferably, at most 6.0 wt. %; more preferably, at most 5.5 wt. %; even more preferably at most 5.0 wt. %; most preferably at most 4.5 wt. % and even most preferably at most 4.0 wt. %.

The grafting agent is introduced in the extruder by the main hopper, for example via a specific dosing system, or via a lateral injection in the extruder; preferably, the grafting agent is introduced via the main hopper.

The step of providing a grafting agent may further comprises providing one or more additives in addition to the grafting agent. For example, one or more additives such as, by way of example, antioxidants, light stabilizers, acid scavengers, flame retardants, lubricants, antistatic additives, nucleating/clarifying agents, colourants, slip agents, anti-blocking agents, processing aids and any mixture thereof.

Although peroxides are not required, in an embodiment, the process further comprises providing one or more peroxides in addition to the grafting agent.

For example, the content of peroxide is at most 1000 ppm based on the total weight of the polyethylene-containing material; preferably at most 800 ppm; more preferably at most 500 ppm; even more preferably at most 200 ppm and most preferably at most 100 ppm.

For example, the content of peroxides is ranging from 0 to 1000 ppm based on the total weight of the polyethylene-containing material; preferably from 10 to 800 ppm; more preferably from 20 to 500 ppm, even more preferably from 30 to 250 ppm and most preferably from 50 to 100 ppm.

For example, the one or more peroxide are or comprise organic peroxides selected from the group consisting of diacetyl peroxide, cumyl-hydro-peroxide, dibenzoyl peroxide, dialkyl peroxide, 2,5-dimethyl-2,5-di(tert-butylperoxy)-hexane, and combinations thereof.

In a preferred embodiment the process is devoid a step of providing one or more peroxides in addition to the grafting agent. In such an embodiment no peroxides are used so that the content of peroxide is 0 ppm.

The Modified Polyethylene Composition Obtained and the Step (e) Recovering a Modified Polyethylene Composition Step (e) comprises recovering a modified polyethylene composition that is the grafted and treated polyethylene-containing material.

For example, the modified polyethylene composition has a melt index ($MI_2$ T) ranging from 1.0 to 200.0 g/10 min as determined according to ISO 1133-2011 at 190° C. under a load of 2.16 kg. For example, the modified polyethylene composition has a melt index ($MI_2$ T) ranging from 2.0 to 200.0 g/10 min as determined according to ISO 1133-2011 at 190° C. under a load of 2.16 kg; preferably, ranging from 4.0 to 180.0 g/10 min; more preferably ranging from 10.0 to 100.0 g/10 min; even more preferably ranging from 1.0 to 70.0 g/10 min; most preferably ranging from 1.0 to 50.0 g/10 min and even most preferably, ranging from 1.0 to 30.0 g/10 min.

For example, the modified polyethylene composition recovered in step (e) has a melt index $MI_2$ ranging from 1.0 to 20.0 g/10 min as determined according to ISO 1133-2011 at 190° C. under a load of 2.16 kg; preferably ranging from 1.2 to 10.0 g/10 min; even more preferably from 1.5 to 8.0 g/10 min and most preferably from 2.0 to 5.0 g/10 min.

With preference, the grafting agent is present in the modified polyethylene composition at a content ranging from 0.8 to 5.0 wt. % based on the total weight of the modified polyethylene composition; preferably from 0.9 to 4.0 wt. %; more preferably from 1.0 to 3.5 wt. %; more preferably from 1.0 to 3.2 wt. % or from 1.0 to 3.0 wt. %, most preferably, from 1.1 to 2.8 wt. % or from 1.1 to 2.5 wt. %; and even most preferably from 1.2 to 2.2 wt. %.

With preference, the grafting agent is present in the modified polyethylene composition at a content of at least 1.1 wt. % based on the total weight of the modified polyethylene composition; preferably, at least 1.2 wt. %; more preferably, at least 1.3 wt. %; even more preferably, at least 1.4 wt. % and most preferably, at least 1.5 wt. %.

It is understood that the grafting agent content represent the grafted content as determined by titration and does not include the unreacted grafting agent. In other words, the grafting agent content determination is performed after purification as described in the methods. Purification can include a venting procedure performed at the end of the extruder.

With preference, the modified polyethylene composition has a density of at least 0.910 g/cm$^3$ as determined according to ISO 1183-1:2012 at 23° C.; preferably, at least preferably, at least 0.912 g/cm$^3$; more preferably, at least 0.915 g/cm$^3$; and even more preferably of at least 0.916 g/cm$^3$.

In an embodiment, the modified polyethylene composition has a density of at least 0.940 g/cm$^3$ as determined according to ISO 1183-1:2012 at 23° C.; preferably, at least preferably, at least 0.945 g/cm$^3$; more preferably, at least 0.948 g/cm$^3$; even more preferably of at least 0.950 g/cm$^3$; and most preferably, of at least 0.951 g/cm$^3$.

For example, the modified polyethylene composition has a density of at most 0.965 g/cm$^3$ as determined according to ISO 1183-1:2012 at 23° C.; preferably, of at most 0.962 g/cm$^3$; and more preferably, of at most 0.960 g/cm$^3$.

For example, the modified polyethylene composition has a density ranging from 0.940 g/cm$^3$ to 0.965 g/cm$^3$ as determined according to ISO 1183-1:2012 at 23° C.; preferably, ranging from 0.942 g/cm$^3$ to 0.964 g/cm$^3$; more preferably, ranging from 0.945 g/cm$^3$ to 0.962 g/cm$^3$; and even more preferably, ranging from 0.948 g/cm$^3$ to 0.960 g/cm$^3$.

In another embodiment, the modified polyethylene composition has a density of at least 0.910 g/cm$^3$ as determined according to ISO 1183-1:2012 at 23° C.; preferably, at least preferably, at least 0.912 g/cm$^3$; more preferably, at least 0.915 g/cm$^3$; and even more preferably of at least 0.916 g/cm$^3$.

For example, the modified polyethylene composition has a density of less than 0.940 g/cm$^3$ or at most 0.935 g/cm$^3$ or at most 0.930 g/cm$^3$ as determined according to ISO 1183-1:2012 at 23° C.; preferably, of at most 0.928 g/cm$^3$; and more preferably, of at most 0.925 g/cm$^3$.

For example, the modified polyethylene composition has a density ranging from 0.910 g/cm$^3$ to less than 0.940 g/cm$^3$ as determined according to ISO 1183-1:2012 at 23° C.; preferably from 0.910 g/cm$^3$ to 0.935 g/cm$^3$ or from 0.910 g/cm$^3$ to 0.930 g/cm$^3$; preferably, ranging from 0.912 g/cm$^3$ to 0.928 g/cm$^3$; more preferably, ranging from 0.915 g/cm$^3$ to 0.925 g/cm$^3$; and even more preferably, ranging from 0.916 g/cm$^3$ to 0.925 g/cm$^3$.

The modified polyethylene composition corresponds to the starting material that has been grafted and thermally treated to increase the melt index. However, surprisingly, the thermal treatment performed also provide other features to the modified polyethylene composition that makes it particularly suitable for injection molding.

In particular, it was found that the modified polyethylene composition has a ratio of complex viscosity at a frequency of 0.1 rad/sec to the complex viscosity at a frequency of 100 rad/sec of at most 10, said ratio being measured at 190° C.; preferably, of at most 9.0; more preferably, of at most 8.5; even more preferably, of at most 8.0; and most preferably, of at most 7.0.

In an embodiment, the modified polyethylene composition has a complex viscosity at 0.1 rad/sec at 190° C. of at most 20,000 Pas; preferably at most 18,000 Pa·s; more preferably at most 15,000 Pa·s; even more preferably of at most 12,000 Pa·s most preferably of at most 10,000 Pa·s; and even most preferably of at most 9,000 Pa·s; or at most 8,000 Pa·s, or at most 5,000 Pa·s.

In an embodiment, the modified polyethylene composition has a complex viscosity at 0.1 rad/sec at 190° C. ranging from 200 to 20,000 Pas; preferably from 250 to 18,000 Pa·s; more preferably from 300 to 15,000 Pa·s; even more preferably from 400 to 12,000 Pa·s; most preferably from 410 to 10,000 Pa·s; and even most preferably from 410 to 9,000 Pa·s; or from 400 to 8,000 Pa·s, or from 400 to 5,000 Pa·s.

With preference, the modified polyethylene composition has an Mz/Mw of at most 7.0 as determined by size exclusion chromatography; preferably at most 6.0; preferably at most 5.0.

For example, the modified polyethylene composition further has an Mw/Mn ranging from 2.5 to 10.0 as determined by size exclusion chromatography; preferably from 2.6 to 8.0; more preferably from 2.7 to 6.0; even more preferably from 2.8 to 5.0 or from 2.9 to 4.5.

For example, the modified polyethylene composition further has a tan delta (G"/G') at 0.1 rad at 190° C. above 2.5; preferably of at least 3.0; more preferably of at least 5.0 and even more preferably of at least 10.0.

In one embodiment, the polyethylene-containing material further has a tan delta (G"/G' measured at 0.1 rad/s at 190° C.) of at most 3.0; preferably of at most 2.6.

In one embodiment, the polyethylene-containing material further has a tan delta (G"/G' measured at 0.1 rad/s at 190° C.) ranging from 0.5 to 3.0; preferably, from 0.8 to 2.6.

The Composite Material

The disclosure also relates to a composite material and to a method to produce such a composite material.

The method to produce a composite material is remarkable in that it comprises producing a modified polyethylene composition from a polyethylene-containing material according to the above-described process, or providing a modified polyethylene composition according to the above definition and melt-blending the modified polyethylene composition with one or more fillers; with preference, the polyethylene-containing material is a recycled polyethylene-containing material. More preferably, the composite material is a wood-plastic composite comprising the modified polyethylene composition and wood fibres. The modified polyethylene may also be used as an intermediate layer in multi-layers structures like multi-layers films. Such devices are produced by lamination or directly in film production machine equipped with multilayers die (and of course with multiple extruders).

When used to compatibilise polar fillers with apolar matrixes, the one or more fillers are preferably selected from talc mineral filler, wollastonite, calcium carbonate, modified calcium carbonate, coated calcium carbonate, glass fibres, wood fibres, bamboo fibres, flax fibres, hemp fibres, carbon fibres, metal fibres, graphite fibres, silica fibres, silica-alumina fibres, alumina fibres, zirconia fibres, boron nitride fibres, silicon nitride fibres, boron fibres, potassium titanate whisker, aluminium borate whisker, magnesium-based whisker, silicon-based whisker, carbon black, carbon nanotubes, graphene nanotubes, and any mixture thereof; with preference, one or more fillers are selected from talc mineral filler, wollastonite, calcium carbonate, modified calcium carbonate, coated calcium carbonate, glass fibres, wood fibres, bamboo fibres, flax fibres, hemp fibres, carbon black, carbon nanotubes, graphene nanotubes, and any mixture thereof The content of the one or more fillers ranges from 0 to 60 wt. % as based on the total weight of the composite material; preferably from 0.1 to 50.0 wt. %, more preferably from 0.2 wt. % to 40.0 wt. %, even more preferably from 0.5 wt. % to 30.0 wt. %, most preferably from 1.0 wt. to 20 wt. %, even most preferably from 1 wt. % to 15.0 wt. %, or from 1 wt. % to 12.5 wt. %, or from 1.0 wt. % to 5 wt. %.

The content of the modified polyethylene composition may be at most 10 wt. % as based on the total weight of the composite material; preferably at most 8.0 wt. %; more preferably at most 5.0 wt. %; even more preferably at most 3.0 wt. % and most preferably at most 2.0 wt. %.

For example, the composite material comprises from 0.1 to 60 wt. % of one or more fillers, and from 0.5 to 10 wt. % of modified polyethylene composition, the remaining being polyethylene; for example, the polyethylene-containing material and preferably recycled polyethylene-containing material.

In an embodiment, the composite material comprises at least 0.1 wt. % of one or more fillers, as based on the total weight of the composite material, preferably at least 0.5 wt. %, more preferably at least 1.0 wt. %.

With preference, the composite material comprises at most 40.0 wt. % of one or more fillers, as based on the total weight of the composite material, preferably at most 30 wt. %, more preferably at most 20 wt. %, even more preferably at most 15 wt. %, most preferably at most 12.5 wt. % or at most 5 wt. %.

The disclosure also relates to multi-layered article remarkable in that it comprises at least one layer comprising the modified polyethylene composition and at least one barrier layer. For example, the barrier layer may be an organic polymer capable of providing the desired barrier properties, such as an ethylene-vinyl alcohol copolymer (EVOH), or a metal, for example, aluminum or stainless steel.

When used in multilayers structures, the modified polyethylene layer thickness is usually ranging between 1 and 50 μm, preferably between 5 and 25 μm.

For example, the multi-layered article characterized in that it comprises at least one layer comprising the modified polyethylene composition according to the present disclosure and at least one barrier layer wherein the barrier layer comprises ethylene-vinyl alcohol copolymer or a metallic material selected from aluminium or stainless steel; with preference, the multi-layered article is selected from a pipe or a film or a food-packaging.

Test Methods

The melt flow index $MI_2$ of the polyethylene is determined according to ISO 1133-2011 at 190° C. under a load of 2.16 kg.

The HLMI of the polyethylene is determined according to ISO 1133-2011 at 190° C. under a load of 21.6 kg.

The Mn, Mw, Mz, Mw/Mn and Mz/Mw: The molecular weight ($M_n$ (number average molecular weight), $M_w$ (weight average molecular weight) and molecular weight distributions D (Mw/Mn) and D' (Mz/Mw) were determined by size exclusion chromatography (SEC. Briefly, a GPC-IR5 from Polymer Char was used: 10 mg polyethylene sample was dissolved at 160° C. in 10 ml of trichlorobenzene for 1 hour. Injection volume: about 400 μl, automatic sample preparation and injection temperature: 160° C. Column temperature: 145° C. Detector temperature: 160° C. Two Shodex AT-806 MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})=0.965909\times\log_{10}(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight $M_i$. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The molecular weight distribution (MWD) is then calculated as Mw/Mn.

The comonomer content in polyethylene is determined by $^{13}$C-NMR analysis of pellets according to the method described by G. J. Ray et al. (*Macromolecules*, 1977, 10, (4), 773-778).

Crystallisation temperature (Tc) and Melting temperature (Tm) is determined according to ISO 11357-3:2018 on a DSC Q2000 instrument by TA Instruments. To erase the thermal history the samples are first heated to 220° C. and kept at 220° C. for 3 minutes. Then the polymer is cooled at −20° C./min. up to 20° C. and kept at 20° C. for 3 minutes. The crystallization temperature is determined during this cooling step. The crystallization temperature Tc corresponds to the temperature of the extremum of the spectrogram presenting the heat flux associated with the polymer as a function of the temperature during its cooling. The polymer is then melted up to 220° C. at 20° C./min. and the melting temperature is determined during this heating step. The melting temperature corresponds to the temperature of the extremum of the spectrogram presenting the heat flux associated with the polymer as a function of the temperature during its melting.

The density was measured according to the method of standard ISO 1183-1:2012 (immersion method) at a temperature of 23° C.

Complex shear modulus and viscosity: The complex shear modulus $G^*(w)=G'(w)+jG''(w)$ ($J^2=-1$, $G'(w)$: storage modulus and $G''(w)$: loss modulus) was determined using a DHR-2, a stress-controlled rheometer from TA Instruments. Frequency sweeps have been carried out in the linear domain (1% strain) at 190° C. from 100 to 0.01 rad·s$^{-1}$ under nitrogen flow to prevent thermal oxidative degradation. The used geometry was 25 mm diameter parallel plates with a 2 mm gap. The samples (25 mm diameter, 2 mm thickness) for these experiments were obtained beforehand using an injection press (Babyplast type). The complex viscosity $\eta^*(\omega)$ is calculated according to the following equation of the linear viscoelasticity:

$$|\eta^*(\omega)| = \left[\left(\frac{G'(\omega)}{\omega}\right)^2 + \left(\frac{G''(\omega)}{\omega}\right)^2\right]^{1/2}$$

Determination of the MA Content (Titration)

Few grams of the grafted product are purified in a vacuum oven at 140° C. for 24 h, this step is crucial in order to remove all of the unreacted maleic acid by evaporation beyond the melting temperature of the polymer. This step is not needed when a venting procedure in performed at the end of the extruder.

The grafted maleic anhydride reacts with water hence forming the maleic acid form (diacid) which is optically active due to the presence of one asymmetric carbon in its molecule.

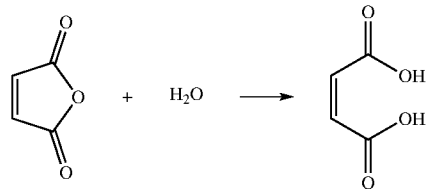 [SMILES: O=C1C=CC(=O)O1 ; O ; O=C(O)/C=C\C(=O)O]

Hydrolysis of Maleic Anhydride to Form Maleic Acid

The MA content of the purified products is calculated from the acid number. 0.5 g of the grafted polymer with maleic anhydride are dissolved in xylene at 120° C. in a flask with high agitation for 30 min. Then water drops are added to the solution after lowering the temperature to c.a. 100° C. The hot solution is then titrated immediately with ethanolic 0.05N KOH using three to four drops of 1% thymol blue in DMF indicator, the equivalence is observed when the solution turns from clear yellow to blue. A 0.5-1.0 mL excess of KOH solution is added, and the deep blue color was back-titrated to yellow end point by the addition of 0.05N isopropanolic HCl to the hot solution. The ethanolic KOH solution is previously standardized against a solution of known concentration of potassium hydrogen phthalate in water using phenolphthalein indicator.

The acid number and the maleic anhydride content were calculated as follow:

$$\text{Acid Number (mg } KOH/g) = \frac{V_{eq} \times N_{KOH} \times 56,1}{m_{polymer-g-MA}}$$

$$MA(\%) = \frac{\text{acid number} \times 98}{2 \times 561}$$

The grafted MA content is classified in 4 categories:
Low: 0.2-0.5%
Medium: 0.5-0.8%
High: 0.8-1%
Very high: above 1% (1-1.5%)
Ultra high: above 1.5%

EXAMPLES

The following non-limiting examples illustrate the disclosure

Example 1—Selection of the Material

The Polyethylene

PE1=Polyethylene HDPE 5502 commercialised by TotalEnergies. The density according to ISO 1183-1:2012 is 0.954 g/cm³; the $MI_2$ according to ISO 1133-2011 (190° C., 2.16 kg) is 0.25 g/10 min; the HLMI according to ISO 1133-2011 (190° C., 21.6 kg) is 22 g/10 min. The polyethylene was produced using a chromium-based catalyst.

The storage modulus (G') at 0.1 rads and at 190° C. was measured to be 1,855 Pa and the loss modulus (G") at 0.1 rads and at 190° C. was measured to be 2,798 Pa; resulting in a tan delta (G"/G') of 1.5.

Below table 1 provides the molar mass distribution obtained using size exclusion chromatography.

TABLE 1

| PE1 | Mn (Da) | Mw (Da) | Mz (Da) | Mw/Mn | Mz/Mw |
|---|---|---|---|---|---|
| HDPE5502 | 19000 | 150000 | 1380000 | 8 | 9.2 |

PE1 was elected as, from a melt index point of view, it is representative of the melt index of important recycled polyethylene feedstocks.

The Maleic Anhydride

MA1=is a commercial maleic anhydride provided by sigma Aldrich (Merck) and received in flake forms. It is micronized and used directly in the process. Maleic anhydride rapidly hydrolyzes to form maleic acid in the presence of water.

TABLE 2

Characteristics and properties of maleic anhydride.

| | |
|---|---|
| Preferred name | Furan-2,5-dione |
| CAS Number | 108-31-6 |
| Molar Mass (g/mol) | 98.06 |
| Formula | C2H2(CO)2O |
| Melting point (° C.) | 52.8 |
| Boiling point (° C.) | 202 |
| Appearance | White crystals or needles, flakes/powder |
| Density (g/cm³) | 1.48 |
| Structure | 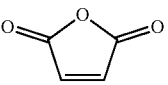 |

Example 2—Grafting by Extrusion High Temperature

The Screw Profile P1

The screw profile P1 is illustrated in FIG. 1 and is composed of four major segments:

The first segment is the one of the feeding zones, composed of successive conveying elements. The second segment is composed of progressive high shear screw elements successive kneading blocks elements with disks offset by 30 degrees, 60 degrees, and 90 degrees and a disk width of at least 0.3 D wherein D is the screw diameter. The third segment consists of alternating conveying screw elements and kneading blocks elements. The third segment comprises the hot zone of the extruder.

The fourth and last segment consists of conveying elements and the die.

The temperature profile starts by a low temperature in the feeding zone (65° C.) and is increased progressively to 250° C. in the second segment (blending-fusion segment, Z3-Z5). Then the temperature is increased progressively in Z6-Z7 (300 and 320° C. respectively) in order to reach the high temperature Ts fixed in the zones Z8-Z12. Afterwards, the temperature is lowered progressively until it reaches 200° C. in Z17 and the die in order to cool the melt. The one or more hot zones of the extruder are hence aimed in the zones Z8-Z12.

| The screw profile P1 | | |
|---|---|---|
| No. element | mm | Leistritz name |
| 1 | 30 | GFA-2-20-30 |
| 2 | 60 | GFF-2-30-30-A |
| 3 | 90 | GFF-2-30-30-A |
| 4 | 120 | GFF-2-30-30-A |
| 5 | 150 | GFA-2-30-30 |
| 6 | 165 | GFA-2-30-15 |
| 7 | 195 | GFA-2-20-30 |
| 8 | 225 | GFA-2-20-30 |
| 9 | 240 | KB 4-2-15-30°-Re |
| 10 | 255 | KB 4-2-15-30°-Re |
| 11 | 270 | KB 4-2-15-60°-Re |
| 12 | 285 | KB 4-2-15-60°-Re |
| 13 | 300 | KB 4-2-15-90° |
| 14 | 315 | KB 4-2-15-90° |
| 15 | 330 | GFA-2-20-15 |
| 16 | 360 | GFA-2-30-30 |
| 17 | 390 | GFA-2-30-30 |
| 18 | 420 | GFA-2-30-30 |
| 19 | 450 | GFA-2-30-30 |
| 20 | 465 | GFA-2-20-15 |
| 21 | 480 | GFA-2-20-15 |
| 22 | 510 | GFA-2-20-30 |
| 23 | 540 | GFA-2-20-30 |
| 24 | 555 | KB 4-2-15-30°-Re |
| 25 | 570 | KB 4-2-15-60°-Re |
| 26 | 585 | GFA-2-20-15 |
| 27 | 600 | GFA-2-20-15 |
| 28 | 630 | GFA-2-20-30 |
| 29 | 660 | GFA-2-20-30 |
| 30 | 675 | KB 4-2-15-60°-Re |
| 31 | 690 | KB 4-2-15-90° |
| 32 | 720 | GFA-2-30-30 |
| 33 | 750 | GFA-2-30-30 |
| 34 | 780 | GFA-2-30-30 |
| 35 | 810 | GFA-2-30-30 |
| 36 | 840 | GFA-2-20-30 |
| 37 | 870 | GFA-2-20-30 |
| 38 | 900 | GFA-2-20-30 |
| 39 | 915 | KB 4-2-15-30°-Re |
| 40 | 930 | KB 4-2-15-60°-Re |
| 41 | 960 | GFA-2-30-30 |
| 42 | 990 | GFA-2-30-30 |
| 43 | 1020 | GFA-2-20-30 |
| 44 | 1035 | KB 4-2-15-60°-Re |
| 45 | 1050 | KB 4-2-15-60°-Re |
| 46 | 1080 | GFA-2-30-30 |
| 47 | 1110 | GFA-2-30-30 |
| 48 | 1140 | GFA-2-30-30 |
| 49 | 1170 | GFA-2-30-30 |
| 50 | 1200 | GFA-2-30-30 |
| 51 | 1215 | GFA-2-20-15 |
| 52 | 1245 | GFA-2-20-30 |
| 53 | 1275 | GFA-2-20-30 |

| The barrel configuration | | |
|---|---|---|
| No. element | mm | Leistritz name |
| A | 75 | Zyl-E |
| B | 76 | Wärmesperre |
| C | 151 | Zyl-0/MC |
| D | 226 | Zyl-0/MC |
| E | 301 | Zyl-0/MC |
| F | 376 | Zyl-0/MC |
| G | 451 | Zyl-0/MC |
| H | 526 | Zyl-0/MC |
| I | 601 | Zyl-0/MC |
| J | 676 | Zyl-0/MC |
| K | 751 | Zyl-0/MC |
| L | 826 | Zyl-0/MC |
| M | 901 | Zyl-0/MC |
| N | 976 | Zyl-0/MC |
| O | 1051 | Zyl-0/MC |
| P | 1126 | Zyl-0/MC |
| Q | 1201 | Zyl-1/MC |
| R | 1276 | Zyl-0/MC |

The Grafting by Extrusion High Temperature and the Results

The products were obtained by twin screw extrusion using co-rotating extruder from Leistritz ZSE18 MAXX/HPe 68D (cylinder diameter=18 mm) with a 1200 rpm as maximum speed. This extruder includes 17 heating/cooling (ZIK) zones (excluding the die) that withstand a maximum temperature of 450° C. The feeding was exclusively made in the feeding zone and was made by gravimetry. The diameter of the die is of 3 mm.

The polymer joint is drive in a cooling water bath of 2.5 m tall that ends with an airflow drying system before entering the pelletizer. The extruder is equipped with 3 efficient fume extraction arms.

The first screw profile experiences aimed to compare the properties of pure products (without maleic anhydride), that underwent merely the same process conditions as the grafted products (with maleic anhydride, $MA_i$ in the following refers to the initial introduced MA wt % in the mixture).

polyethylene is thermally stable, the grafted content of maleic anhydride is almost nil. No change in the MI2 values is noted.

Based on thermograms, it is believed that the temperature of 320° C. corresponds to the beginning of the production of free radicals and chain scissions (β-scission). Moreover, some recombination reactions of macro-radicals (chains of polyethylene with a one radical) can be noted, this can be referred to as branching or some crosslinking reactions. The impact of this kind of reactions can be seen in the rheology data where the measured complex viscosity of the extruded samples at 320° C. without maleic anhydride is higher than that of the HDPE 5502 (FIG. 3).

The presence of maleic anhydride in the formulations at 320° C. has resulted in a decrease in the complex viscosity with respect to the HDPE 5502. There is a clear impact of the presence of maleic anhydride at high temperature on the modification of polyethylene (chain scissions are probably more induced in the presence of maleic anhydride). In both cases, with and without maleic anhydride, there is a clear decrease in the molar masses, this decrease is greater for the formulation with maleic anhydride (Mw/Mn and Mz/Mw decrease significantly). The Mw decreased of 26 and 38% for the pure and the grafted sample, respectively. No change in MI2 values is to be noted.

The HDPE 5502 is representative of polyethylene PCR and it contains in its recipe some antioxidants and stabilizers that would enhance its thermal stability at high temperature. Despite that there is a production of free radicals from the beginning of the modification of polyethylene; it stays limited by the presence of antioxidants and stabilizers in the system, hence hindering the reactions of grafting of maleic anhydride. This is why the grafted MA content at 320° C. is low (0.5%).

At 360° C., there is definitely a higher production of radicals than in the experiment at 320° C. allowing the addition of maleic anhydride on the polyethylene chains. The grafted MA content is very high (1.1%). A higher decrease in molar masses and molar mass distribution

TABLE 3

Process conditions, Molar masses, grafted MA contents and MFI results for experiments obtained with the screw profile "P1". (Molar masses are obtained by size exclusion chromatography and rounded, grafted MA contents are obtained by Acid-base titration)

| T (° C.) | N (rpm) | Q (kg/h) | $MA_i$ (%) | Mn (Da) | Mw (Da) | Mz (Da) | Mw/Mn | Mz/Mw | MI2 (g/10 min) | g-MA (%) |
|---|---|---|---|---|---|---|---|---|---|---|
| Raw HDPE5502 | | | 0 | 19,000 | 150,000 | 1,383,000 | 8.0 | 9.2 | 0.4 | 0.0 |
| 200 | 400 | 3 | 0 | 19,000 | 151,000 | 1,317,000 | 8.0 | 8.7 | 0.4 | 0.0 |
| 200 | 400 | 3 | 3 | 18,750 | 157,000 | 1,575,000 | 8.4 | 10.0 | 0.4 | 0.1 |
| 320 | 400 | 3 | 0 | 18,700 | 111,000 | 496,000 | 5.9 | 4.5 | 0.2 | 0.0 |
| 320 | 400 | 3 | 3 | 17,050 | 93,000 | 402,000 | 5.4 | 4.3 | 0.2 | 0.5 |
| 360 | 400 | 3 | 0 | 17,650 | 77,000 | 239,000 | 4.4 | 3.1 | 0.8 | 0.0 |
| 360 | 400 | 3 | 3 | 15,000 | 54,500 | 143,000 | 3.6 | 2.6 | 1.8 | 1.1 |
| 390 | 400 | 3 | 0 | 15,300 | 49,500 | 114,500 | 3.2 | 2.3 | 8.2 | 0.0 |
| 390 | 400 | 3 | 3 | 12,650 | 37,000 | 78,500 | 2.9 | 2.1 | 28.2 | 1.3 |

The raw HDPE 5502 presents high molar mass and high Mw/Mn and Mz/Mw, it is representative of polyethylene PCR (rPE), having an MI2 of 0.12 g/10 min. From this polyethylene, several experiments have been made in order to control the variation of the molar masses and of the grafting content with the process conditions following this screw profile.

At 200° C., the molar masses of polyethylene do not vary compared to that of the polyethylene. It is noted that the Mz/Mw has slightly increased. At this temperature, the Mw/Mn and Mz/Mw is observed due to the dominant chain scission reactions; the Mw decreased of 48 and 64% for the pure and the grafted sample, respectively. The complex viscosity and the molar masses decrease more with the experiment with maleic anhydride than that with the pure polyethylene. There is a clear increase in the MI2 of 100 and 350% for pure and grafted samples, respectively.

At 390° C., the production of free radicals in situ is at its highest, the grafting of maleic anhydride is very high (above 1%: 1.3%). Moreover, the molar masses and their distribution have been reduced drastically, The Mw decreased of 67 and 75% for the pure and the grafted sample, respectively. Moreover, the complex viscosity is reduced especially for the formulation with maleic anhydride; the complex viscosity is Newtonian on the whole range of the angular frequency.

All in all, the functionalization of polyethylene with maleic anhydride by reactive extrusion through thermal initiation was successful using the presented screw profile. A grafted MA content up to 1.3 wt % and an MI2 of 28 g/10 min were obtained. The obtained products have lower molar masses, lower than those extruded without maleic anhydride. It is hence concluded an additional effect of maleic anhydride on the modification and the increase of MI2.

Example 3—Grafting by Extrusion High Temperature

The Screw Profile P2-1CF

In order to intensify the "Flash reactive extrusion" desired process, a second screw profile P2-1-CF was conceived and is illustrated in FIG. 2. The aim of this screw profile is to increase the modification and the time of exposition of the melt to the high temperatures. For this reason, in addition to the fusion and mixing zone at the beginning of the screw profile, a high shear screw elements were added in the zones Z8-Z12 where Ts is the high temperature for each extrusion experiment. In order to increase the filling ratio, and hence the time of exposition of the melt to the high temperature, a reverse element (i.e. a left-handed screw element) was added at the end of this segment.

| The screw profile P2-1CF | | |
| --- | --- | --- |
| No. element | mm | Leistritz name |
| 1 | 30 | GFA-2-20-30 |
| 2 | 60 | GFF-2-30-30-A |
| 3 | 90 | GFF-2-30-30-A |
| 4 | 120 | GFF-2-30-30-A |
| 5 | 150 | GFA-2-30-30 |
| 6 | 165 | GFA-2-20-15 |
| 7 | 195 | GFA-2-20-30 |
| 8 | 225 | GFA-2-20-30 |
| 9 | 240 | KB 4-2-15-30°-Re |
| 10 | 255 | KB 4-2-15-30°-Re |
| 11 | 270 | KB 4-2-15-60°-Re |
| 12 | 285 | KB 4-2-15-60°-Re |
| 13 | 300 | KB 4-2-15-90° |
| 14 | 315 | KB 4-2-15-90° |
| 15 | 330 | GFA-2-20-15 |
| 16 | 360 | GFA-2-30-30 |
| 17 | 390 | GFA-2-30-30 |
| 18 | 420 | GFA-2-30-30 |
| 19 | 450 | GFA-2-30-30 |
| 20 | 480 | GFA-2-30-30 |
| 21 | 495 | GFA-2-20-15 |
| 22 | 510 | GFA-2-20-15 |
| 23 | 540 | GFA-2-20-30 |
| 24 | 570 | GFA-2-20-30 |
| 25 | 600 | GFA-2-20-30 |
| 26 | 630 | GFA-2-20-30 |
| 27 | 660 | GFA-2-20-30 |
| 28 | 675 | KB 4-2-15-30°-Re |
| 29 | 690 | KB 4-2-15-30°-Re |
| 30 | 705 | KB 4-2-15-60°-Re |
| 31 | 720 | KB 4-2-15-60°-Re |
| 32 | 735 | KB 4-2-15-60°-Re |
| 33 | 750 | KB 4-2-15-90° |
| 34 | 765 | GFA-2-20-15-L |
| 35 | 795 | GFA-2-30-30 |
| 36 | 825 | GFA-2-30-30 |
| 37 | 855 | GFA-2-30-30 |
| 38 | 885 | GFA-2-30-30 |
| 39 | 915 | GFA-2-30-30 |
| 40 | 945 | GFA-2-30-30 |
| 41 | 975 | GFA-2-30-30 |
| 42 | 1005 | GFA-2-30-30 |
| 43 | 1020 | GFA-2-20-15 |
| 44 | 1035 | GFA-2-20-15 |
| 45 | 1065 | GFA-2-20-30 |
| 46 | 1095 | GFA-2-20-30 |
| 47 | 1125 | GFA-2-20-30 |
| 48 | 1155 | GFA-2-20-30 |
| 49 | 1185 | GFA-2-20-30 |
| 50 | 1215 | GFA-2-20-30 |
| 51 | 1245 | GFA-2-20-30 |
| 52 | 1275 | GFA-2-20-30 |

| The barrel configuration | | |
| --- | --- | --- |
| No. element | mm | Leistritz name |
| A | 75 | Zyl-E |
| B | 76 | Wärmesperre |
| C | 151 | Zyl-0/MC |
| D | 226 | Zyl-0/MC |
| E | 301 | Zyl-0/MC |
| F | 376 | Zyl-0/MC |
| G | 451 | Zyl-0/MC |
| H | 526 | Zyl-0/MC |
| I | 601 | Zyl-0/MC |
| J | 676 | Zyl-0/MC |
| K | 751 | Zyl-0/MC |
| L | 826 | Zyl-0/MC |
| M | 901 | Zyl-0/MC |
| N | 976 | Zyl-0/MC |
| O | 1051 | Zyl-0/MC |
| P | 1126 | Zyl-0/MC |
| Q | 1201 | Zyl-1/MC |
| R | 1276 | Zyl-0/MC |

With this high shear temperature profile, the objective was to increase the MFI as well as the grafted MA content.

TABLE 4

Process conditions, Molar masses, grafted MA contents and MFI results for experiments obtained with the screw profile "P2-1CF". (Molar masses are obtained by size exclusion chromatography, grafted MA contents are obtained by Acid-base titration)

| T (° C.) | N (rpm) | Q (kg/h) | $MA_i$ (%) | Mn (Da) | Mw (Da) | Mz (Da) | Mw/Mn | Mz/Mw | MI2 (g/10 min) | g-MA (%) |
|---|---|---|---|---|---|---|---|---|---|---|
| Raw | HDPE5502 | | 0 | 19,000 | 150,000 | 1,383,000 | 8.0 | 9.2 | 0.4 | 0 |
| 320 | 400 | 3 | 3 | 15,000 | 54,000 | 149,000 | 3.6 | 2.8 | 0.9 | 0.9 |
| 320 | 800 | 3 | 3 | n.d. | n.d. | n.d. | n.d. | n.d | n.d. | 0.9 |
| 360 | 400 | 3 | 3 | 12,500 | 36,000 | 78,000 | 2.9 | 2.2 | 4.3 | 1.6 |
| 360 | 800 | 3 | 3 | n.d. | n.d. | n.d. | n.d. | n.d. | n.d. | 1.1 |
| 390 | 400 | 3 | 3 | 10,000 | 24,000 | 45,000 | 2.5 | 1.9 | 179 | 2.2 |
| 390 | 800 | 3 | 3 | n.d. | n.d. | n.d. | n.d. | n.d. | n.d. | 1.8 |
| 420 | 400 | 3 | 3 | 9,000 | 20,000 | 35,500 | 2.3 | 1.8 | >500 | 1.7 |

The same tendencies were obtained with this screw profile. At 320° C., at the beginning of the modification of polyethylene, the molar masses have decreased drastically due to the high shear intensity of the screw profile. $M_w$ decreased of 64% compared to the raw HDPE 5502, this decrease was followed by an increase in MI2 of 125%. The reaction of grafting of maleic anhydride on polyethylene has occurred, and the grafted MA content is high (0.9%). At 360° C., above the temperature of beginning of the modification of polyethylene, the decrease in molar masses is greater, the Mw has decreased of 76% while the MI2 recorded 4.3 g/10 min for the experiment at 400 rpm. The grafted MA content was ultra-high at 400 rpm (~1.6%) and very high at 800 rpm (~1.1%). At 390° C., the grafted MA content recorded its highest value among all of the conducted experiments, it is ultra-high (>2%) at 400 rpm. The grafted MA content decreased to 1.8% at 800 rpm. As for the molar masses, the decrease was brutal, and was for Mw of 85% at 400 rpm. The MI2 was highly increased and it reached 179 g/10 min. Finally, at 420° C., the molar masses continued on decreasing drastically, Mw decreased of 87% and the recorded MI2 was higher than the capacity of the measurement instrument (exceeded 500 g/10 min). The grafted content was lower than that of 390° C. and recorded 1.7%. All of the molar masses decrease were naturally followed with a decrease in Mw/Mn and Mz/Mw and thus a narrowing in the molar mass distributions.

Through the extrusions, a decrease in the grafted MA content is observed for all extrusions realized at N=800 rpm. This could be due to the fact that at 800 rpm, the self-heating effect is intensified and the real melt temperatures are higher than the setpoint temperatures.

Figure 10:
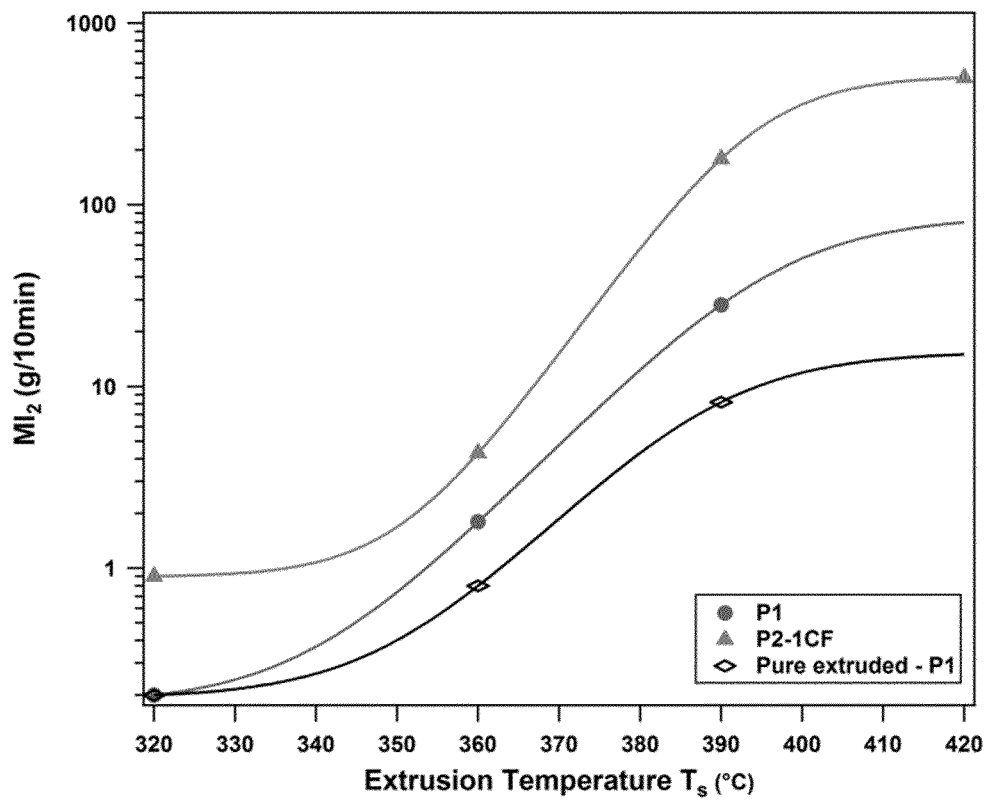
FIG. 10 is MI2 and grafted MA content as a function of the extrusion setpoint Temperature (maximum barrel temperature) for experiments realized at N=400 rpm with both screw profiles. Curves are drawn as guides for the eye.
Figure 11:
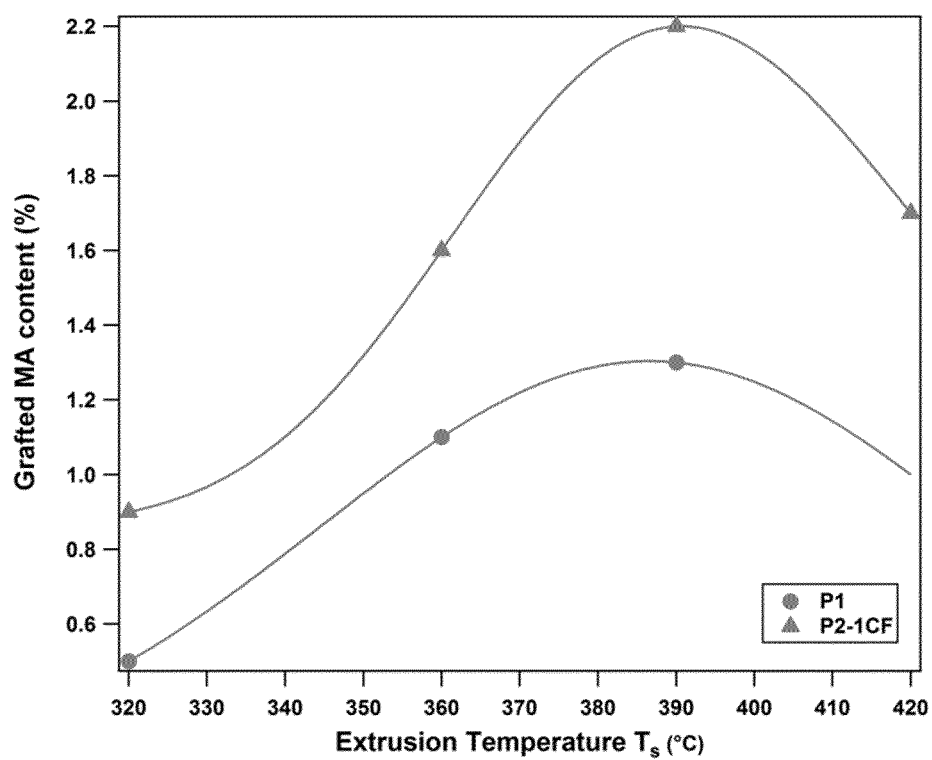
FIG. 11 is Grafted MA content as a function of the extrusion setpoint Temperature (maximum barrel temperature) for experiments realized at N=400 rpm with both screw profiles. Curves are drawn as guides for the eye.

As seen in FIGS. 10 and 11, the MI2 of the obtained products increases with the temperature as expected. The MI2 of grafted products is higher than the pure products and it is much higher with the second screw profile than that of the first one, which is a consequence of the longer exposition time to the Flash temperature thanks to the presence of the reverse element at the end of the Flash segment, promoting hence chain scissions. Moreover, for the grafted MA content, both screw profiles have curves that seem to pass through maxima of grafting at 390° C. with a higher grafted MA content for the profile "P2-1CF" (double the grafted content). However, beyond 390° C., the grafted MA content starts decreasing due to violent flash temperatures that promote the degradation of bigger quantities of maleic anhydride. These maxima are observed only on the grafted MA content curves and not on the MFI curves as the MI2 continues on increasing notwithstanding the decrease of the grafted MA content. It is hence possible to conceive new products with very high MFI and very acceptable grafted MA content (at 420° C., MI2=500 g/10 min and grafted MA content=1.7%).

The invention claimed is:

1. Process of grafting of a polyethylene-containing material to produce a modified polyethylene composition characterized in that it comprises:
   a) providing a twin screw extruder with one or more thermal regulation devices;
   b) providing a polyethylene-containing material comprising at least 50 wt. % of polyethylene based on the total weight of the polyethylene-containing material;
   c) providing a grafting agent in a content ranging from 0.8 to 10.0 wt. % based on the total weight of the polyethylene-containing material provided on step (b), wherein the grafting agent comprises at least one double bond per molecule;
   d) extruding the polyethylene-containing material and the grafting agent to obtain a modified polyethylene composition; wherein step (d) of extruding comprises a thermal treatment of the polyethylene-containing material at a maximum barrel temperature Ts ranging from 315° C. to 410° C. in one or more hot zones of the extruder, wherein the thermal treatment is performed by self-heating of the material wherein the one or more hot zones have a total length equal to or greater than 6 D with D being the screw diameter, wherein the extrusion is performed with mechanical specific energy greater than or equal to 0.30 kWh/kg, wherein the screw profile comprises at least one hot zone with successive kneading blocks elements over a length of at least 4 D followed by a left-handed element with D being the screw diameter, wherein the thermal regulation devices, are set to initial imposed barrel temperatures ranging between 240 and 320° C., and are switched off when the barrel temperature in the zone spontaneously exceeds the imposed barrel temperature by at least 3° C. without the need of external heat application; and
   e) recovering a modified polyethylene composition.

2. The process according to claim 1 is characterised in that the screw profile comprises two or more hot zones wherein a first hot zone comprises successive kneading blocks elements over a length of at least 4 D followed by a left-handed element with D being the screw diameter, and one or more additional hot zones placed downstream the first hot zone are filled mixing zones, each comprising kneading blocks elements over a length of at least 4 D followed by a kneading left-handed element or by a left-handed element with D being the screw diameter.

3. The process according to claim 1 is characterised in that the successive kneading blocks elements of at least one hot zone of the extruder comprise disks with disks offset by 90 degrees and a disk width of at least 0.3 D wherein D being the screw diameter.

4. The process according to claim 1 is characterised in that one hot zone of the extruder is or comprises the melting zone of the extruder.

5. The process according to claim 1 is characterized in that the ratio of the melt index of the modified polyethylene composition ($MI_2$ T) to the melt index of the polyethylene-containing material ($MI_2$ R) is at least 2.0.

6. The process according to claim 1 is characterized that step (d) of extruding the polyethylene-containing material comprises a thermal treatment at a maximum barrel temperature Ts at least 330° C.

7. The process according to claim 1 is characterized that step (d) of extruding the polyethylene-containing material comprises a thermal treatment at a maximum barrel temperature Ts ranging from 340 to 395° C.

8. The process according to claim 1 is characterized in that the grafting agent comprises or consists in one or more functional monomers selected from maleic anhydride, glycidyl methacrylate, methyl methacrylate, acrylic acid, butyl acrylate, vinyl acetate, diethyl maleate, acrylamide, acrylonitrile, and any mixture thereof; and/or in that the grafting agent is provided in a content ranging from 1.5 to 4.0 wt. % based on the total weight of the polyethylene-containing material provided on step (b).

9. The process according to claim 1 is characterized in that modified polyethylene composition recovered in step e) shows one or more of:
  a. a melt index $MI_2$ ranging from 1.0 to 200.0 g/10 min as determined according to ISO 1133-2011 at 190° C. under a load of 2.16 kg; and/or
  b. a ratio of complex viscosity at a frequency of 0.1 rad/sec to the complex viscosity at a frequency of 100 rad/sec of at most 10 said ratio being measured at 190° C. as determined according to the method of the description; and/or
  c. a complex viscosity at 0.1 rad/sec at 190° C. of at most 20,000 Pas as determined according to the method of the description; and/or
  d. a grafting agent content of at least 0.7 wt. % based on total weight of the modified polyethylene composition as determined by the titration method of the description.

10. Modified polyethylene composition comprising at least 50 wt. % of polyethylene based on the total weight of the modified polyethylene composition, characterized in that the modified polyethylene composition has:
  a. a melt index $MI_2$ ranging from 1.0 to 200.0 g/10 min as determined according to ISO 1133-2011 at 190° C. under a load of 2.16 kg;
  b. a ratio of complex viscosity at a frequency of 0.1 rad/sec to the complex viscosity at a frequency of 100 rad/sec of at most 10 said ratio being measured at 190° C. as determined according to the method of the description;
  c. a complex viscosity at 0.1 rad/sec at 190° C. of at most 20,000 Pas as determined according to the method of the description;
  d. a grafting agent content of at least 0.7 wt. % based on total weight of the modified polyethylene composition as determined by the titration method of the description; and
  e. a density of at least 0.940 g/cm$^3$ as determined according to ISO 1183-1:2012 at 23° C.

11. The modified polyethylene composition according to claim 10 is characterized in that it has an Mz/Mw of at most 7.0 as determined by size exclusion chromatography.

12. The modified polyethylene composition according to claim 10 is characterized in that it has an Mw/Mn ranging from 2.5 to 10.0 as determined by size exclusion chromatography.

13. The modified polyethylene composition according to claim 10 is characterized in that it has a tan delta (G"/G') at 0.1 rad at 190° C. above 2.5.

14. The modified polyethylene composition according to claim 10 is characterized in that it has a melt index $MI_2$ ranging from 1.0 to 50.0 g/10 min as determined according to ISO 1133-2011 at 190° C. under a load of 2.16 kg.

15. The modified polyethylene composition according to claim 10 is characterized in that it has a ratio of complex viscosity at a frequency of 0.1 rad/sec to the complex viscosity at a frequency of 100 rad/sec of at most 8.0 said ratio being measured at 190° C. as determined according to the method of the description.

16. The modified polyethylene composition according to claim 10 is characterized in that it has a complex viscosity at 0.1 rad/sec at 190° C. of at most 18,000 Pa·s as determined according to the method of the description.

17. The modified polyethylene composition according to any claim 10 is characterized in that it has a grafting agent content of at least 1.1 wt. % based on total weight of the modified polyethylene composition as determined by the titration method of the description.

18. The modified polyethylene composition according to claim 10 is characterized in that it has a density of at least 0.945 g/cm$^3$ as determined according to ISO 1183-1:2012 at 23° C.

19. Composite material characterized in that it comprises the modified polyethylene composition according to claim 10 and one or more fillers selected from talc mineral filler, wollastonite, calcium carbonate, modified calcium carbonate, coated calcium carbonate, glass fibres, wood fibres, bamboo fibres, flax fibres, hemp fibres, carbon fibres, metal fibres, graphite fibres, silica fibres, silica-alumina fibres, alumina fibres, zirconia fibres, boron nitride fibres, silicon nitride fibres, boron fibres, potassium titanate whisker, aluminium borate whisker, magnesium-based whisker, silicon-based whisker, carbon black, carbon nanotubes, graphene nanotubes, and any mixture thereof.

20. A multi-layered article characterized in that it comprises at least one layer comprising the modified polyethylene composition according to claim 10 and at least one barrier layer wherein the barrier layer comprises ethylene-vinyl alcohol copolymer or a metallic material selected from aluminium or stainless steel.

* * * * *